(12) United States Patent
Kaehler et al.

(10) Patent No.: US 11,164,227 B2
(45) Date of Patent: Nov. 2, 2021

(54) AUGMENTED REALITY DEVICES, SYSTEMS AND METHODS FOR PURCHASING

(71) Applicant: MAGIC LEAP, INC., Plantation, FL (US)

(72) Inventors: Adrian Kaehler, Los Gatos, CA (US); Gary Bradski, Plantation, FL (US); Prasanna Krishnasamy, Plantation, FL (US); Doug Lee, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 850 days.

(21) Appl. No.: 15/192,724

(22) Filed: Jun. 24, 2016

(65) Prior Publication Data

US 2017/0039613 A1 Feb. 9, 2017

Related U.S. Application Data

(60) Provisional application No. 62/184,150, filed on Jun. 24, 2015, provisional application No. 62/195,184, filed on Jul. 21, 2015.

(51) Int. Cl.
*G06Q 30/00* (2012.01)
*G06Q 30/06* (2012.01)
(Continued)

(52) U.S. Cl.
CPC ..... *G06Q 30/0611* (2013.01); *G02B 27/0172* (2013.01); *G06Q 30/0283* (2013.01);
(Continued)

(58) Field of Classification Search
None
See application file for complete search history.

(56) References Cited

U.S. PATENT DOCUMENTS 9,665,881 B1* 5/2017 Ward ............... G06Q 30/0239
2004/0267611 A1* 12/2004 Hoerenz ............ G06Q 10/0637
705/14.13
(Continued)

FOREIGN PATENT DOCUMENTS

EP 2544138 A1 1/2013
JP 2013077328 A 4/2013
(Continued)

OTHER PUBLICATIONS

International Search Report for PCT Application No. PCT/US2016/039401, dated Nov. 3, 2016, filed on Jun. 24, 2016, 4 pages.
(Continued)

*Primary Examiner* — William J Allen
*Assistant Examiner* — Maria S. P. Heath
(74) *Attorney, Agent, or Firm* — Morrison & Foerster LLP

(57) ABSTRACT

Disclosed herein is an augmented reality (AR) system that provides information about purchasing alternatives to a user who is about to purchase an item or product (e.g., a target product) in a physical retail location. In some variations, offers to purchase the product and/or an alternative product are provided by the merchant and/or competitors via the AR system. An offer negotiation server (ONS) aggregates offer data provided various external parties (EPs) and displays these offers to the user as the user is considering the purchase of a target product. In some variations, an AR system may be configured to facilitate the process of purchasing items at a retail location.

26 Claims, 12 Drawing Sheets

(51) Int. Cl.
    *G02B 27/01* (2006.01)
    *G06Q 30/02* (2012.01)
    *G06T 19/00* (2011.01)
(52) U.S. Cl.
    CPC ..... *G06Q 30/0629* (2013.01); *G06Q 30/0643* (2013.01); *G06T 19/006* (2013.01); *G02B 2027/014* (2013.01)

(56) References Cited

U.S. PATENT DOCUMENTS

| | | |
|---|---|---|
| 2007/0210155 A1 | 9/2007 | Swartz et al. |
| 2012/0154557 A1* | 6/2012 | Perez ............... H04N 21/47205 348/53 |
| 2012/0280040 A1 | 11/2012 | Carney et al. |
| 2014/0172570 A1* | 6/2014 | y Arcas ................ H04W 4/21 705/14.58 |
| 2014/0279422 A1 | 9/2014 | Holman et al. |
| 2015/0242943 A1 | 8/2015 | Abovitz et al. |
| 2015/0348101 A1* | 12/2015 | Junger ............... G06Q 30/0211 705/14.51 |
| 2015/0363816 A1* | 12/2015 | Poglitsch ........... G06Q 30/0235 705/14.35 |

FOREIGN PATENT DOCUMENTS

| | | |
|---|---|---|
| JP | 2013521576 A1 | 6/2013 |
| JP | 2014520341 A | 8/2014 |
| JP | 2015111358 A | 6/2015 |
| WO | 2011122654 A1 | 6/2011 |
| WO | WO2011106798 A1 | 9/2011 |
| WO | WO2012177382 A2 | 12/2012 |
| WO | WO-2016/210354 A1 | 12/2016 |

OTHER PUBLICATIONS

Notice of Reasons for Rejection, dated Jan. 15, 2020, for JP Application No. 2017-566275, with English translation, 18 pages.
Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.
Bimber, Oliver et al. (2005). "Spatial Augmented Reality: Merging Real and Virtual Worlds," A. K. Peters, Ltd., Wellesley, MA.
Israeli Office Action dated Sep. 23, 2020, for IL Patent Application No. 256344, with English translation, seven pages.
Notice of Final Rejection, dated Sep. 16, 2020, for JP Application No. 2017-566275, with English translation, 6 pages.
Examination Report dated Apr. 6, 2021, for Australian Application No. 2016284700, five pages.
Notice of Allowance, dated May 20, 2021, for JP Application No. 2017-566275, with English translation, six pages.
Indian Office Action dated May 5, 2021, for IN Application No. 201847002916, with English translation, six pages.
Chinese Office Action dated Apr. 22, 2021, for CN Application No. 201680047017.X, with English translation, 23 pages.

* cited by examiner

| Item ID | Quantity |
|---|---|
| $ID_1$ | $Q_1$ |
| $ID_2$ | $Q_2$ |
| $ID_3$ | $Q_3$ |
| $ID_4$ | $Q_4$ |
| $ID_5$ | $Q_5$ |
| ... | ... |

| User ID | Item ID | Status | Item Location |
|---|---|---|---|
| 1 | A | Carried | $x_1, y_1$ |
| 1 | B | Carried | $x_1, y_1$ |
| 1 | C | Carried | $x_1, y_1$ |
| 2 | C | Purchased | $x_2, y_2$ |
| 2 | D | Carried | $x_2, y_2$ |
| ... | ... | ... | ... |

| Item Instance | Customer ID | Item Location |
|---|---|---|
| $ID_1$ | $N_1$ | $x_1, y_1$ |
| $ID_2$ | $N_2$ | $x_1, y_1$ |
| $ID_3$ | $N_3$ | $x_1, y_1$ |
| $ID_4$ | $N_4$ | $x_2, y_2$ |
| $ID_5$ | $N_5$ | $x_2, y_2$ |
| ... | ... | ... |

| Item ID | Purchase Price |
|---|---|
| $ID_{1P}$ | $P_1$ |
| $ID_{2P}$ | $P_2$ |
| $ID_{3P}$ | $P_3$ |
| $ID_{4P}$ | $P_4$ |
| $ID_{5P}$ | $P_5$ |
| ... | ... |

AUGMENTED REALITY DEVICES, SYSTEMS AND METHODS FOR PURCHASING

CROSS-REFERENCE TO RELATED APPLICATIONS

This application claims priority to U.S. Provisional Patent Application No. 62/184,150 filed Jun. 24, 2015 and U.S. Provisional Patent Application No. 62/195,184 filed Jul. 21, 2015, the disclosures of which are hereby incorporated by reference in their entirety.

BACKGROUND

Increasingly, consumers purchase goods and services by using digital devices and technology. Various technological platforms have been developed to assist a consumer in comparing the features and prices of goods and services. Some applications assist a consumer in selecting a product that suits their needs, while other applications provide price comparisons between various merchants and vendors. For purchases made over the internet, a consumer has ready access to a great deal of product, price and vendor information, all of which can be pulled up on the computer display before and during the purchase.

However, for purchases made at a physical retail location, such information is not as easily accessible without the user diverting their attention from the product at hand to query their smart phone (or other such portable electronic device) to access information about the product that is not available at the retail location. In many cases, the consumer would prefer to obtain such information without drawing the attention of a sales person. Furthermore, the small display of a smart phone or other portable device tends to limit the amount of information a consumer is able to reference in a brief period of time.

Accordingly, it may be desirable to integrate the ease of information acquisition over the internet with the shopping experience at a physical retail location to help a consumer make decisions about purchasing a particular product from a particular merchant. It may also be desirable to facilitate the purchase process of items selected by a consumer at a retail location.

BRIEF SUMMARY

Disclosed herein are augmented reality (AR) devices, systems and methods that facilitate the purchase of one or more items or products at a retail location. An AR system may comprise a wearable AR device that is configured to capture information associated with an item for sale in a retail location or store. The wearable AR device (ARD) may be configured to monitor the movement and/or location of the particular item as the shopper moves around the store. When one or more predetermined criteria are met, the item may be designated as "carried" or "purchased." For example, when the item is detected to be at a location different from its original location but within the store perimeter, it may be designated as "carried". When the user selects a purchase option on the AR device while viewing or carrying the item, information associated with the item may be relayed to a remote server that may process the purchase transaction. At the completion of the purchase transaction, the item may be designated as "purchased." The AR systems and methods disclosed herein may facilitate the purchase of an item (e.g., the transfer of funds from the user to the merchant in exchange for one or more items selected by the user at the retail location) by allowing the purchase transaction to occur between a user's ARD and a server, without requiring the user to queue at a check-out counter or interact with a sales associate. In some variations, a user's ARD may maintain a database that stores information about the items that are carried or purchased by the user, and the information in the database may be used to prompt the user to pay for unpurchased items carried by the user prior to leaving the retail location. An AR system may optionally provide information about purchasing alternatives to a shopper who is about to purchase an item or product (hereafter "the target") in a physical retail location. Information about purchasing alternatives may be provided by the merchant and/or competitors to that merchant. Information provided by the merchant may include recommendations for a similar product that better suits the needs of the shopper and/or related or correlated products that are associated with the target, where the recommended products are sold by the merchant. The recommended products may be sold at the physical retail location, and/or on the merchant's website. They may include incentives to purchase from the retailer based on time, location, inventory, or facts about that particular customer.

One variation of a system for presenting purchase offers to a user may comprise an augmented reality (AR) device configured to identify a target product being considered by a user for purchase and to identify the price of the target product at a retail location, and a remote server. The AR device may have wireless capability and may be in wireless communication with the remote server. The remote server may have a database of computer-executable instruction sets, where each instruction set may be specific to a different product. The remote server may be configured to retrieve from the database a target product-specific instruction set based on target product identification data and target product price transmitted by the augmented reality device, where the target product-specific instruction set may comprise an alternate product and an alternate product offer price. The remote server may also execute the target product-specific instruction set to compare the target product price and the alternate product offer price, and generate a purchase offer data structure if the alternate product offer price is less than the target product price, where the offer data structure may comprise the alternate product offer price. The remote server may also be configured to transmit the purchase offer data structure to the AR device. In some variations, the alternate product may be available at a local merchant, and/or available online by the same merchant as a merchant at the retail location, and/or available online by a different merchant from a merchant at the retail location. Optionally, the price of the target product may be adjusted based on alternate product offer price. For example, the price of the target product may be reduced if the user agrees to purchase the target product before they depart the retail location.

One variation of a method of presenting purchase offers to a user may comprise identifying, using an augmented reality (AR) device, a target product that is being considered for purchase by a user, transmitting target product data from the augmented reality device to a remote server, where target product data may comprise target product identification data and target product price, and executing a computer-implemented method on the remote server to generate a purchase offer. In some variations, the computer-implemented method may comprise identifying, using the product identification data, a computer-executable instruction set specific to the target product, executing the product-specific computer-executable instruction set to generate a purchase offer data structure having an alternate product and an alternate product offer price, comparing the target product price and the alternate product offer price, and transmitting the purchase offer data structure to the augmented reality device if the alternate product offer price is less than the target product price. The method may also comprise displaying the purchase offer from the remote server to the user via the AR device. Displaying the purchase offer to the user may comprise displaying the alternate product offer price to the user. The target product data may further comprise the geographic location of the target product, and optionally, the geographic location may be represented by GPS coordinates. In some variations, identifying the target product using the AR device may comprise detecting that the user is interested in the target product. For example, the AR device may determine, based on the direction of the user's head as measured by a motion sensor or orientation sensor and/or eye-tracking sensors, that the user is looking at a target product (e.g., the duration of user gaze on one product is relatively longer than the gaze on other products). Alternatively or additionally, image sensors on the AR device may detect that the user has physically engaged with the target product, for example, by grasping or holding it in the field-of-view of the AR device image sensors. The AR device may be configured to do this by acquiring, using an image sensor of the AR device, an image of the user and executing instructions stored on computer-readable media of the augmented reality device that recognizes visual features in the image that indicate close proximity between the target product and the user. Target product data may comprise product category data. In some variations, the alternate product may be the same as the target product and/or may be in the same product category as the target product. Displaying the purchase offer may comprise displaying a graphic representing the alternate product and the alternate product offer price. A method for presenting purchase offers to a user may also comprise transmitting a signal from the AR device to the remote server indicating whether the user has accepted the purchase offer.

In some variations, a remote server may comprise a database of a plurality of computer-executable instruction sets, where each computer-executable instruction set may be specific to a different product, and the database may be stored in non-volatile computer-readable medium. One or more of the plurality of the product-specific computer-executable instruction sets may have been transmitted to the remote server from a second remote server. In some variations, the second remote server is controlled by a merchant. In some variations, the method may further comprise transmitting offer decision data from the AR device to the remote server indicating whether the user has accepted the purchase offer. Optionally, the method may also comprise generating a notification data structure, which may be transmitted from the remote server to the second remote server, where the notification data structure comprises offer decision data. Optionally, the notification data structure may further comprise user-identification data, such as user payment data.

Another variations of a method of presenting purchase offers to a user may comprise identifying, using an augmented reality (AR) device, a target product that is being considered for purchase by a user, transmitting target product data from the augmented reality device to a remote server, wherein target product data comprises target product identification data and target product price, and executing a computer-implemented method on the remote server to generate a purchase offer. In some variations, the computer-implemented method may comprise identifying, using the product identification data, a purchase offer data structure having an alternate product and an alternate product offer price, comparing the target product price and the alternate product offer price, transmitting the purchase offer data structure to the augmented reality device if the alternate product offer price is less than the target product price, and displaying the purchase offer from the remote server to the user via the augmented reality device.

Also described herein is a system for purchasing an item, the system comprising a wearable augmented reality device (ARD) having wireless communication capability and a control server in wireless communication with the ARD. The ARD may comprise a proximity detector, a motion detector, a position detector, and a computation component in communication with the proximity detector, motion detector and position detector, where the computation component may be configured to determine whether a wearer is in possession of an item using data from the proximity detector and the motion detector and to generate and transmit a signal to the control server, where the signal may indicate the identity of the item and whether the wearer is in possession of the item. The proximity detector may comprise at least one of a RFID reader, a camera, and a scanner. The motion detector may comprise a location estimator configured to detect a change of location of the user device. The position detector may comprise a global positioning system or a wireless based location determining system. The signal may indicate that the wearer is in possession of the item if the presence of the item is detected by the proximity detector while the wearer is determined to be moving by the motion detector or at a different location from an original location of the item by the position detector. The control server may generate and transmit a purchase signal to the ARD in order to prompt the wearer to purchase the item. In some variations, the proximity detector may comprise a directional antenna RFID reading device. The control server may store user location data, item identification data and item location data from the ARD into a database of a memory of the control server. In some variations, the control server may generate an item data structure in response to the ARD signal, where the item data structure may include an item identification code, a URL, carry status and purchase status of the item, where the item data structure may be stored into a database.

Another variation of a system may comprise a shopper device configured to track one or more items being carried by a user, a server connected to the shopper device and configured to receive status information of the one or more items, checkout device configured to detect the one or more items and request the status information of the one or more items from the server, and an employee device configured to receive an alert from the checkout device when the status of at least one item indicates that the item has not been purchased. The server may be configured to complete a purchase of an item when the received status information of the item indicates the item is to be purchased. Some systems may comprise a payment system configured to provide payment information to the server to facilitate the purchase of the item. The server may be configured to complete a purchase of an item in response to a message received from the checkout device. In some variations, the employee device may be configured to display a message indicating that at least one item has not been purchased. The checkout device may be located at an entrance of a store or a checkout area of the store. The shopper device may be configured to determining the status information of the one or more items.

DETAILED DESCRIPTION

This disclosure generally relates to augmented reality devices, systems and methods for purchasing goods and/or services at a retail location. These devices, systems and methods may provide the user with the option of purchasing a selected item at a retail location without waiting in a line or interacting with a sales associate. An augmented reality device (ARD) of an augmented reality (AR) system may capture information associated with an item for sale in a store. For example, an ARD may be configured to identify an item of interest to the user (e.g., viewed or picked up by the user) and to determine whether the user has picked up the item. If the user has picked up the item, the ARD may be configured to monitor the movement and/or location of the item as the user moves around the store. An AR system may further comprise a server (e.g., a merchant server) in communication with the user's ARD and/or other ARDs in the retail location, and if a user wishes to purchase an item, communication between the server and the user's ARD may facilitate the transfer of funds to complete the purchase. Optionally, the server may also track the location of items that have been picked up, and/or the location of the user who picked up the items. The server may use this information to prompt the user to purchase carried items prior to departing the retail location, and/or to generate notifications to the user and/or merchant if the user leaves the retail location with items that have not been purchased.

Some variations of an AR system may optionally be configured to assist a user in deciding whether to purchase an item or target at a retail location. In any retail environment, physical, on line, or virtual (in the sense of an augmented or virtual reality), a time interval exists between the customer's expressing interest in a target and the time the customer makes an actual purchase transaction (or decides not to do so). For purposes of this document we will refer to this period as the negotiation interval. The beginning of the negotiation interval may be triggered by the user viewing, touching, or picking up a target in a retail environment, and/or when the user explicitly indicates (e.g., by voice command and/or selection of a shopping mode) that s/he is considering a product for purchase (the "target"). The end of the negotiation interval may be marked by the user purchasing the product, departing the retail location (with or without having made a purchase), and/or when the user explicitly indicates that they are no longer considering the purchase the target (or any other product or service), which may be indicated by the user placing the target back on the shelf and/or walking away from the target.

Figure 1A:
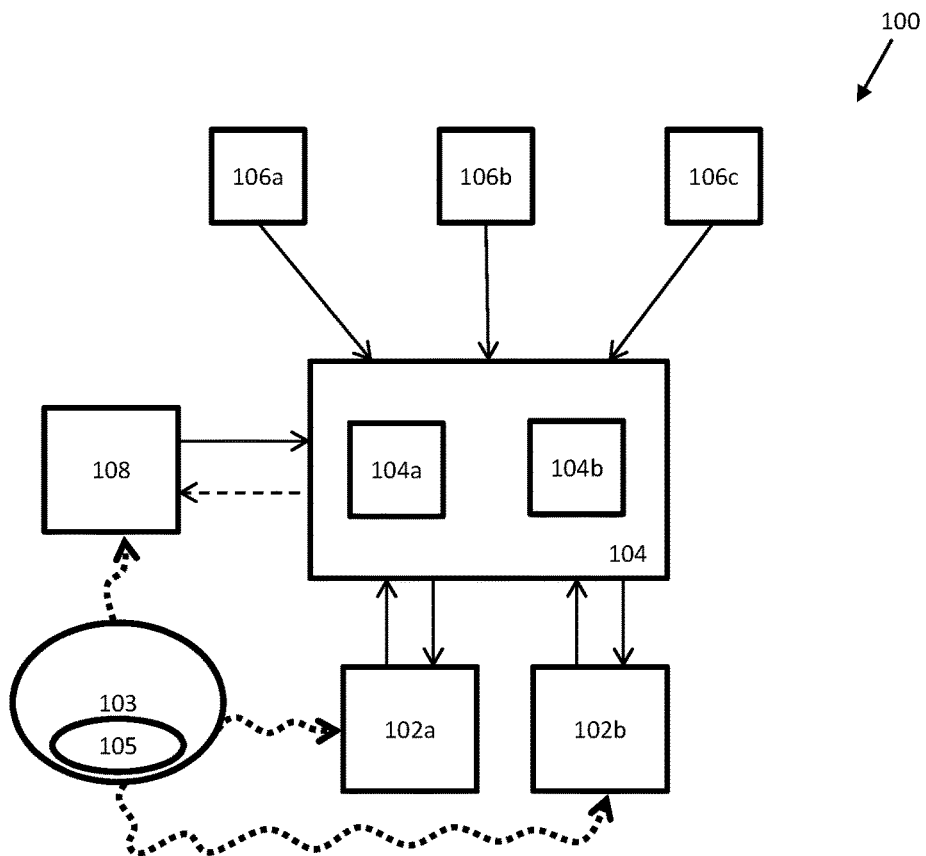
FIG. 1A is a block diagram that represents the modules of an augmented reality system involved with shopping and suggesting purchase alternatives to a user.

Disclosed herein and schematically represented in FIG. 1A is an augmented reality (AR) system 100 that may be configured to facilitate purchase transactions between a shopper or user and a merchant at a retail location and/or to provide purchasing alternatives to a shopper or user. The AR system 100 may comprise a control system or server 104 that is configured to be in communication with one or more augmented reality devices (ARD). The one or more AR devices may comprise one or more ARDs 102a worn by one or more users or shoppers at a retail location and optionally one or more ARDs 102b worn by one or more merchant sales associates at that retail location. The control system or server 104 may be a remote server and may comprise one or more databases stored in one or more machine-readable memories and one or more computer processors that facilitate communication of information/data between the one or more databases and between the one or more databases and one or more ARDs. In one variation, a control system or server 104 may comprise a merchant inventory system or server (MIS) 104a and an offer negotiation system or server (ONS) 104b. Optionally, a purchase system may be in communication with the control system or server 104, or, some variations of a MIS may include a purchase system. These and other systems or servers of the control system may be located at one geographical location or one or more of these system or servers may be located at different geographical locations and communicate to each other via wired (e.g., electrical, optical, or otherwise) or wireless connections.

The MIS 104a may be comprise one or more databases that store inventory data relating to products offered for sale by the merchant of a retail location, and a processor that transmits and receives data from various databases, ARDs (e.g., user ARDs and/or merchant ARDs), and merchant payment counter or console. The MIS processor may optionally be configured to facilitate a purchase transaction. In some variations, a payment counter or console at the retail location and/or a virtual or online purchase system may also communicate data regarding purchases to the MIS of the control system.

The ONS may comprise one or more databases that store data relating to various retail products and services, merchants, and offers, as well as any data that may assist a user in making a purchase decision. The ARD may be configured to wirelessly communicate with the control server 104 to procure data related to the product being considered for purchase by the user (e.g., the target product or "target") and to present this data to the user to aid in the purchase decision. Data relating to the target and offers to purchase that target and/or products or services related to the target (e.g., an alternate product) may be stored in an ONS database (i.e., non-volatile memory of the ONS). In some variations, a control server may be in communication with modules or database structures from external parties (EPs) 106*a*, 106*b*, 106*c*. External parties may be merchants (with or without a web-based store), advertisers, personal shoppers, and the like. Other kinds of entities may also be EPs, for example an EP may be a reviewer such as Consumer Reports or America's Test Kitchen. In some variations, an EP may be an auction server that maintains a database of items for sale by individual users. An auction-based EP may make offers to a user based on a value set by the seller or on existing bids by other users. The user may then respond by bidding a higher payment value, and so on. In some variations, an auction-based EP may offer a fixed price for any item if a buyer wishes to purchase the item immediately instead of bidding with other potential buyers. For example, an auction-based EP may allow sellers to transmit data relating to items for sale, such as item ID, pricing, auction parameters, etc. An ONS may be configured to provide a "blind" forum in which EPs may make offers to the user, based on the user's current activity, without compromising the privacy of that user. EPs may populate the ONS with data regarding the types of ONS transactions in which they would like to take part. The application programming interface (API) provided by the ONS may be configured to support access by ARDs and EPs. ARDs and EPs may be two distinct forms of clients, and may be mutually exclusive in that the methods and protocols associated with the interaction of the ARD with the ONS and those associated with the interaction of the EP with the ONS may not contain any common elements.

An AR system may optionally comprise one or more scanners or readers 108 located throughout the retail location, for example, at or near entrances and exits of the retail location. Each item 103 in the retail location may comprise an identification tag 105 (e.g., RFID tag, barcode, any globally-recognized identification, etc.) that may be detected by the one or more scanners or readers 108 as well as the ARD(s) 102*a*, 102*b*. A scanner or reader may comprise one or more of the following: RFID reader, a bar code reader, a quick response (QR) code reader, a camera, and/or any other types of information readers. The scanners or readers 108 may be in communication with the control system 104 (e.g., wired, wireless or otherwise) in order to transmit scan data to the control system. Optionally, the control system 104 may transmit signals to the scanner(s) 108, for example, commands to activate scanning, deactivate scanning, etc.

When the ARD worn by the user or shopper detects interest by the shopper in a target object, the negotiation interval begins. During this time, the ARD will make contact with the ONS of the control system, which will communicate to the ARD various offers relating to the target, or other products related to the target. The ARD may be configured to provide information and/or may solicit interaction from the user during the negotiation interval, presenting alternative purchasing options which the shopper may find more attractive than continuing with their current course of action (i.e. purchasing that particular instance of that particular product type from that particular merchant on that particular day), options for additional purchases (e.g. "Would you like to buy cheap bags for that new vacuum cleaner?", or other related offers (e.g. "If you buy that car, you can donate your old car to our charity for a tax deduction at the end of the year."). The shopper may pick up and carry the target during the negotiation interval.

At the close of the negotiation interval, the product is either purchased or not purchased, and/or a related or alternate product is either purchased or not purchased. Though any sort of offer is intended to be covered, the sample offers described herein for an in-interval offer are all possible examples of the usage of the system. Regardless of whether any product is purchased, the AR system may choose to take action based on the user's decision. For example, if the shopper decides not to purchase the target, however the ARD system (e.g., ARD device(s), scanners) detect that the shopper is still carrying the target, an alert may be generated by the AR control system and transmitted to the shopper and/or merchant ARDs.

Figure 1B:
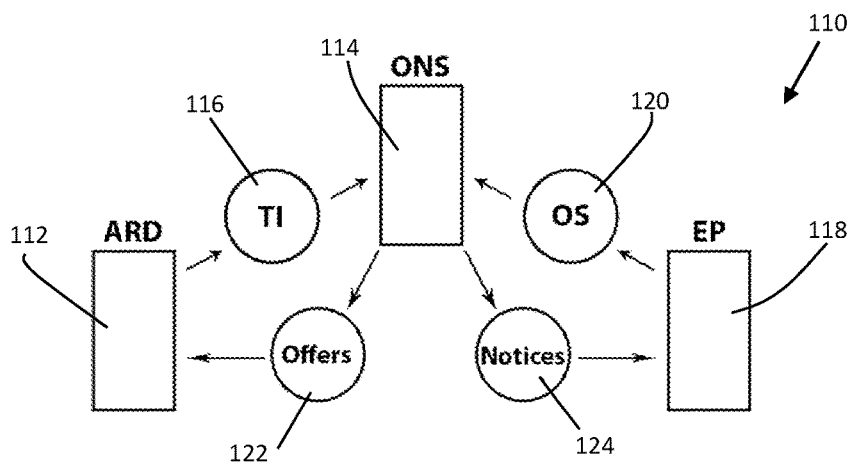
FIG. 1B is block diagram that represents one variation of an augmented reality system that may be configured to suggest purchase alternatives to a user.

FIG. 1B depicts one variation of an AR system 110 with examples of the types of data and information transmitted between the ARD 112, ONS 114 of a control system or server and an EP 118. In some variations, the data and information exchanged between the ARD, ONS and EPs may be in the form of digital data packets or data structures. For example, when the ARD 112 determines that the user is in the process of considering the purchase of a target or other transaction relating to the target, the ARD may create a data packet or data structure called a Transaction Interval (TI). The TI object 116 may comprise identification information about the target being considered, as well as price data, merchant data, and the like. The data contained in a TI object may be specific to the merchant corresponding to the physical location of the user. The TI may be created at the beginning of the negotiation interval, transmitted to the ONS, and then deleted at the end of the negotiation interval. The information contained in the TI may be updated throughout the duration of the negotiation interval, for example, to indicate any real-time price changes. The ONS may use the identification data and/or pricing data from the TI to identify and/or generate an offer 122 that is relevant to the target.

An offer may be any sort of transaction which the shopper may take either as an alternative to the current purchase being considered, or in addition to it. In some variations, an offer may be a solicitation to a user implemented by a computer-executable method to purchase an item at a particular price. For example, an offer may be a unit of a computer-implemented method that is executed by the ONS if certain conditions are met. The ONS may be configured to maintain a database such computer-implemented methods (which may be represented by, for example, scripts). These computer-implemented methods may be offer scripts (OS) 120 that may specify what an EP would like to offer a shopper in the case that a shopper is in the negotiation interval relative to a specific product or class of products. The OSs stored in the ONS database may be generated by the ONS, and/or may be supplied by one or more EPs 118. Once the ONS identifies or generates an OS that is relevant to the target based on the data in the TI, the ONS executes the OS and sends an offer object 122 to the ARD. The offer object 122 may be a data structure and/or data packet that contains information about a suggested product (which may or may not be the same as the target) and a price. Optionally, an offer 122 may also include delivery data and timing.

In some variations, ONS 114 may be configured to communicate to the EP 118 information about whether an offer provided by the EP to the ONS has been accepted or rejected by a user. Such communication may be in the form of a notice object 124, which may be a data structure and/or packet containing information about the product that was offered, at what price, and whether a user accepted a particular offer. Depending on the privacy settings of the user, the notice object 124 may contain user-identification data, or may not contain any data that can be used by the EP 118 to uniquely identify the user. For example, the notice object may be anonymous, so that no unique user data is provided to the EP. The notice object 124 may contain demographic or geographic information of the user (e.g., sex, age, location of the retailer where the target is being considered, etc.) but may not contain unique user data (e.g., credit card information, credit score, residential address, social security numbers, etc.). In some variations, if the user has decided to accept the offer provided by the EP 118, the notice object 124 may, with the permission of the user, contain sufficient user data to finalize the purchase transaction.

As mentioned previously, an ONS may be configured to preserve the privacy of the user such that no user-identification information is transmitted to an EP without prior user consent. In some variations, the data transferred between the ARD and the ONS may be kept separate from the data transferred between the EP(s) and the ONS. For example, the AR system 110 depicted in FIG. 1B and described above may maintain this segregation of information by using the ONS to pair TI objects with relevant OSs provided by an EP, instead of directly connecting the user with that EP. In this architecture, the user is able to consider various offers that may be beneficial to them without necessarily disclosing personal data to the EP. At the same time, the EP may be able to extend offers to multiple users using a single OS stored in the ONS database, instead of soliciting each and every user individually.

Described below are examples of different variations of the components of an AR system and ONS that may be configured to provide purchasing alternatives to a user.

Augmented Reality Device

Figure 2A:
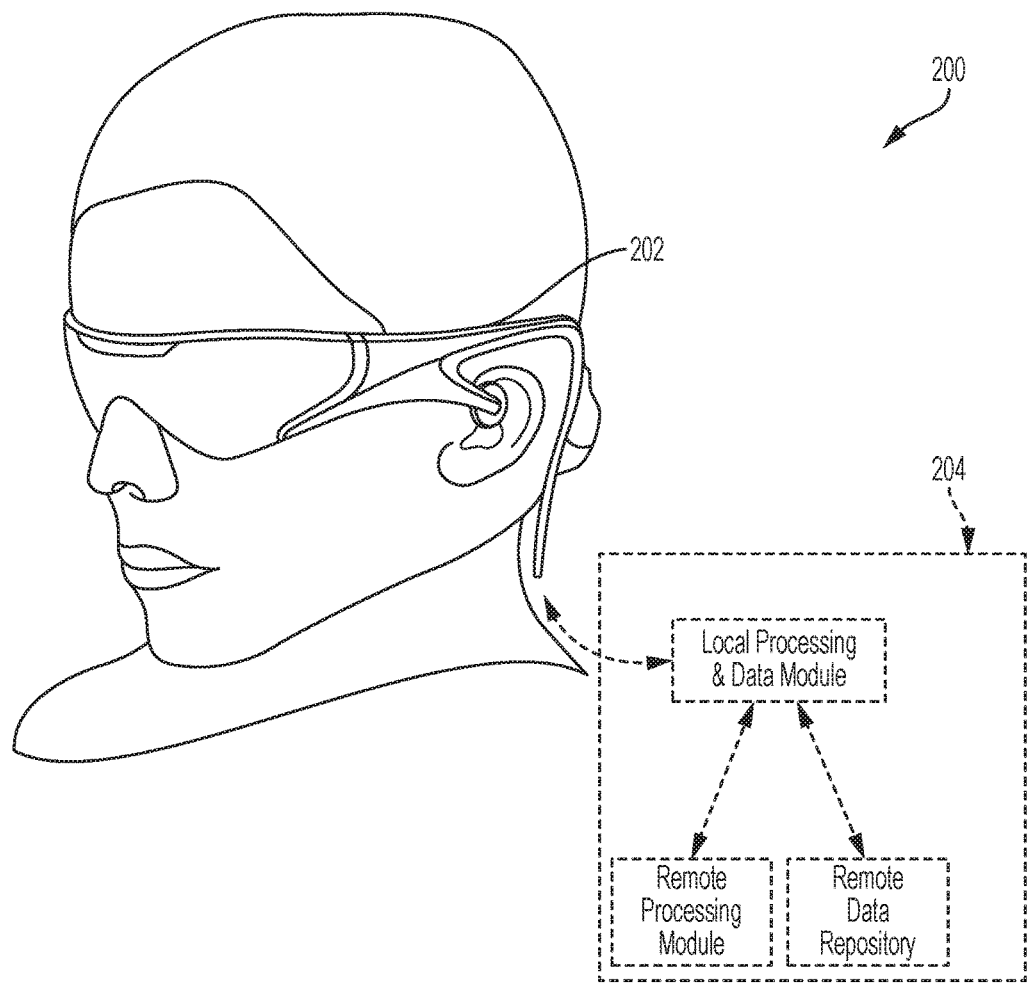
FIG. 2A depicts one variation of an augmented reality device.
Figure 2B:
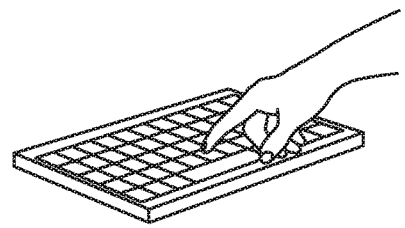
FIGS. 2B-2J depict various secondary devices (totems) that may be used with an augmented reality device as part of an augmented reality system.
Figure 2C:
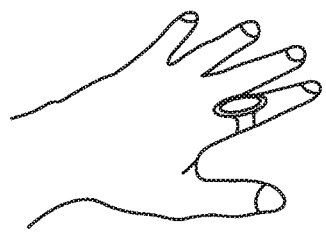
Figure 2D:
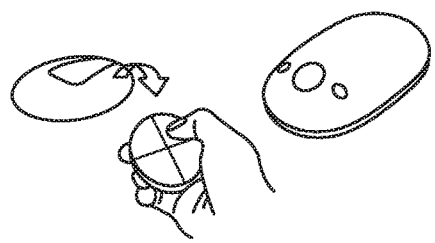
Figure 2E:
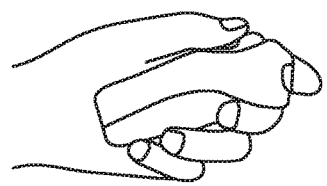
Figure 2F:
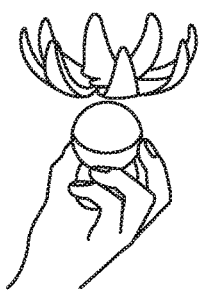
Figure 2G:
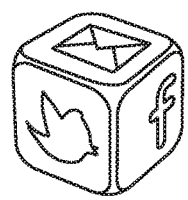
Figure 2H:
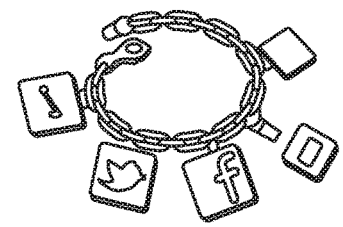
Figure 2I:
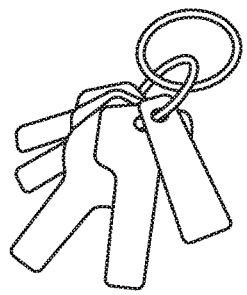
Figure 2J:
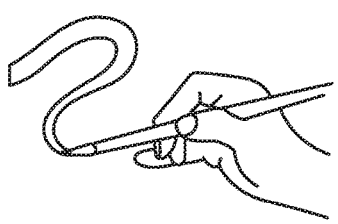

One example of an ARD that is part of an AR system is depicted in FIG. 2A. FIG. 2A depicts an ARD 200 which may be an optical device worn on the user's head, such as glasses 202. In some variations, an ARD may comprise one or more image sensors that capture images that correspond to the field-of-view of the user. The ARD may also comprise a totem that is paired (e.g., selectively wirelessly connected) with the glasses 202, such as any of the totems depicted in FIGS. 2B-2J. A totem is a physical object which may be manipulable by the user to allow input or interaction with the AR system. FIG. 2B depicts a totem that is in the form of a keyboard, FIG. 2C depicts a totem that is in the form of a ring, FIG. 2D depicts a totem that is in the form of a mouse, FIG. 2E depicts a totem that is in the form of hand-held controller, FIG. 2F depicts a totem that is in the form of an orb or flower, FIG. 2G depicts a totem that is in the form of a block, FIG. 2H depicts a totem that is in the form of bracelet, FIG. 2I depicts a totem that is in the form of a keychain, and FIG. 2J depicts a totem that is in the form of stylus or writing instrument. ARD 200 may comprise electronics and microdisplays, operable to deliver augmented reality content to the user, for example augmented reality visual and/or audio content. The electronics 204 may include various circuits including electrical or electronic components. The various circuits may be communicatively coupled to a number of transducers that either deliver augmented reality content, and/or which sense, measure or collect information about the ambient physical environment and/or about a user. The ARD 200 may also comprise an audio subsystem, which may be configured to produce a 3-D sound field. The ARD 200 may comprise a computation component, which may be integrated in the head-worn component or separate from the head-worn component. The computation component may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The computation component may include one or more non-transitory computer media, or processor readable media, for example, volatile and/or nonvolatile memory, for instance read-only memory (ROM), random access memory (RAM), static RAM, dynamic RAM, flash memory, EEPROM, etc. The computation component may be communicatively coupled to the head-worn component 202 and also may comprise transmitters and receivers that may be capable of various forms of communication, including, but not limited to BLUETOOTH®, WI-FIC), or some IEEE 802.1 compliant protocol (e.g., IEEE 802.11n, IEEE 802.11a/c). The ARD 200 may also comprise electronics configured to detect and transmit position data to a remote controller or server. In some variations, the memory of the computation component of an ARD may store one or more databases. For example, an ARD may include a database that contains information about the items in the user's possession, such as the item ID (e.g., GUID, bar code, etc.), item quantity, and whether the item has been purchased. When the ARD detects that the user has picked up an item (e.g., from a shelf at the retail location), put down an item (e.g., back to a shelf at the retail location) or purchased an item, the database may be updated to reflect a change in the status of the item. These events may also be signaled to the MIS and cause similar updates and changes in the databases depicted in FIGS. 6A-6D. When an item comes into the possession of the user, an item data structure (e.g., FIG. 6E) may be instantiated and stored in the database in the ARD memory. Item-specific data (e.g., item ID, GUID, URL, etc.) may be obtained by the ARD from the AR system control server (e.g., MIS database of FIG. 6A or other product databases in communication with the system control server). When an item is purchased, the purchasing system (which may be a third-party system or one that is administered by the merchant via the MIS) may signal the ARD to update the status of the item data structure. A similar signal may be used to update the databases of FIGS. 6A-6D of the MIS.

Figure 2K:
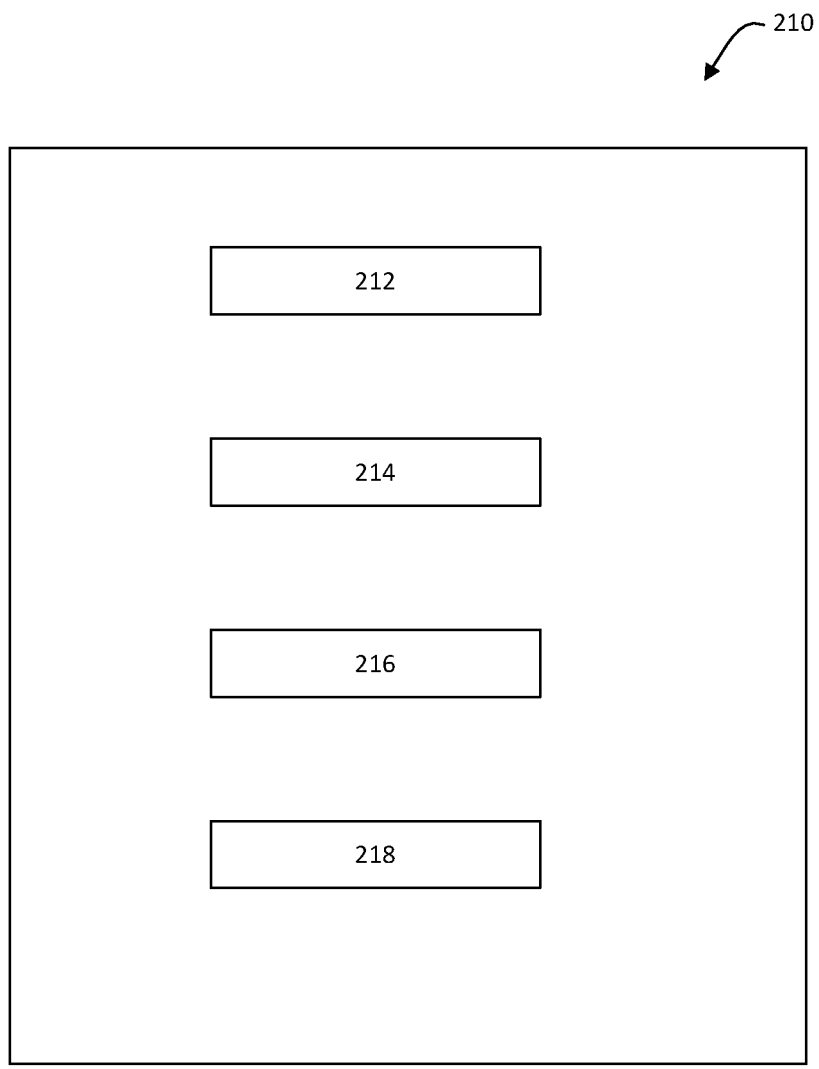
FIG. 2K is a block diagram representation of the components of an augmented reality device.

Another example of an ARD is depicted in FIG. 2K. As shown there, ARD 210 may comprise (in addition to one or more of the elements of ARD 200) an RFID reader 212, a motion detector 214, location sensor 216. The RFID reader 202 may be configured to read information from an RFID tag attached to an item for sale at a retail location. In other variations, the ARD 210 may comprise, for example, a bar code reader, a quick response (QR) code reader, a scanner, a camera, and/or any other types of information readers. The motion detector 214 may be configured to detect movement of the user device 100. For example, on variation of a motion detector may comprise an accelerometer and/or a gyroscope. The location sensor 216 may comprise any suitable system for determining a location of the ARD 210. In some variations a location sensor may comprise a global positioning system (GPS), a cellular or Wi-Fi based location determining system, and/or other systems (e.g., iBeacons) designed for indoor use. In one variation, data from the location sensor 216 may be combined with data derived from computer vision techniques such as visual simultaneous localization and mapping (SLAM) to locate the user/user device in indoor space such as a retail location. The ARD 210 may also comprise an I/O interface 208 for connectivity with other devices. Examples of additional devices may include, but are not limited to, for example, other ARDs, totems, a touch screen/touch pad, keypad, speaker, microphone, display, etc.

The computation component of the ARD may be configured to recognize cues and commands from the user that indicate the beginning and/or end of the negotiation interval. For example, the computation component may be programmed with object recognition software that is able identify objects in the user's environment that are available for purchase. Optionally, the computation component may also communicate with a cloud server to identify objects for purchase using parametric geometry and points as part of a persistent shared cloud-based world model. The computation component may also have a computer-implemented method stored in non-transitory computer media that is able to track hand gestures, body position and to recognize that certain gestures correspond to certain commands and to execute instructions accordingly. For example, the computation component of the ARD may have a first computer-implemented method that recognizes the objects within the user's geographical location that are available for purchase, and a second computer-implemented method that recognizes hand gestures and cues that indicate a likely interest on the part of the user to consider of the object(s) for purchase. In some variations, a computer-implemented feature detection method may use visual cues (e.g., signals from the ARD image sensors) indicating that the user has looked at one item longer than surrounding items, and generate a signal indicating user interest in that item. The beginning of the negotiation interval may also be triggered by an AR system suggesting a product for purchase to the user after the AR system has recognized a pattern of behaviors and conditions that indicate the user is in a retail environment. For example, the AR system may detect that the user is geographically co-located with the physical address of a retail location, and that the user has slowed or stopped their walking pace. The AR system may also access a shopping list maintained by the user and cross-reference the items on the list with the product inventory of the retailer, and remind the user that they may wish to consider purchasing an item that is on their shopping list at that particular retail location. Optionally, the AR system may determine that the user is interested in an object by analyzing the gaze of the shopper, recognizing that the shopper has touched, or picked up the product, or by explicit signaling from the shopper using any user interface (UI) idiom or totem available through the ARD or its associated components (e.g. a wired or wirelessly connected accessory). The presence of the items in combination with the shopper's movement or location can determine whether the shopper is interested in purchasing the items. Other user input received by the user device can confirm the shopper's intent to purchase these items. As such, the shopper is no longer required to go through a point of sale to complete the purchase transaction while visiting a store.

The ARD may be configured to recognize the product that is being viewed by the user. It may do this through the operation of computer vision algorithms, RFID, bar code scanning, or any such object recognition mechanisms, and may do so automatically, or only when an action is initiated by the shopper. In some variations, an ARD (e.g., ARD 210) may detect the presence of an item based on data from a proximity sensor and/or scanner (e.g., RFID scanner) of the ARD, and based on relative movement between the user and the item, the system may determine whether the user is interested in the item. For example, if a motion detector of the ARD senses that the user is moving and the scanner continually senses the presence or proximity of the item, the AR system may prompt the user to initiate a process to purchase the item that is in the possession of the user. In other examples, the orientation of the user's head with respect to the location of the item may indicate that the user is visually interested in the item, even if the user ultimately does not pick up the item. Any attention that the user pays to an item detected by the scanner may prompt the AR system to notify the user and/or merchant such that the user may make a purchase of that item (and/or related items) without requiring the user to walk to a counter or register and queue in a line to complete the purchase transaction.

The ARD may be configured to be paired with a particular ONS already known to the ARD. Optionally, an ARD may be paired with multiple ONS. For example, the ARD manufacturer may "pre-pair" the ARD with a certain ONS, or the user may pair the ARD with additional ONSs of their choice. Consumers may have the opportunity to subscribe to individual ONSs of their choice. In some variations, the operation of, and/or services provided by, an ONS may be configured by the user through a separate app or web interface.

ARD Interaction with Retail Environment

An ARD worn by a shopper may detect (e.g., based on data from the motion detector and/or location sensor) when the shopper enters a retail location having a plurality of products for purchase. The products may be items or objects that are physically located in the retail location or store, and/or may be services that may be purchased and utilized at a time specified by the user (e.g., gift certificates, massage, salon, automobile services and the like). The products may be detected and identified by a shopper's ARD through various mechanisms. For example and as depicted in FIG. 1A, a product 103 may comprise an identification tag 105 that may be recognized and/or detected by the ARD. The tag 105 may be an RFID tag, a bar code, a QR code, or any suitable globally unique identifier (GUID). The tag 105 may include any information associated with the product, for example, any unique or identifiable characteristics of the product (which may be unique among the products offered for purchase at the retail location, or a GUID). A description, price, warranty, and manufacturer associated with the product may optionally be included on the tag 105. The information may optionally include a network address such as a uniform resource locator (URL) associated with a server (e.g., the AR control server) that receives, transmits, and stores data to facilitate purchase transactions involving the product. Alternatively or additionally, an ARD may be able to detect and identify a product by image recognition and processing methods.

An ARD worn by a user may be configured to determine when the user is viewing an item. In one variation, an ARD may use image recognition methods to determine when an item that is available for purchase is within the field-of-view (e.g., in the center of the field-of-view) of the glasses of the ARD. The image recognition method may be able to extract a variety of identification markers or tags (such as any of the tags described above) from a visual scene. In some variations, the ARD may comprise a directional antenna RFID reader that is designed to only register the item(s) at which the user's head is currently pointing. Image recognition methods may identify an item of interest as an item that is located in the center of the field-of-view of the user longer than other items. Alternatively or additionally, the user may manually handle the item and position it in proximity to the viewing portion and/or scanning portion of the ARD, which may help to ensure the item is detected by the ARD. It should also be understood that the tag may be associated with the item by any suitable means, e.g., tethered by a filament, string or wire, adhesives, clipped, and in some variations, may be printed directly on, or embedded within, the item or item packaging.

An AR system may assist both the user and merchant at a retail location by monitoring the status and location of the products available for purchase. In some variations, the identity, location and state (e.g., purchased or not, carried or not) of each item in a retail space may be stored in a memory (e.g., database) of the AR system control server, as will be described further below with respect to FIGS. 6A-6E. The location of each item may be updated, for example, if one or more scanners at the retail space detect the item at a location that is different from its previous location. In some variations, an ARD worn by a shopper may detect that the shopper has picked up the item from the shelf. For example, if the ARD detects the continuous presence of the item (e.g., RFID tag is detected in close proximity) and the user is moving (e.g., as detected by the ARD motion sensor and/or changes in location as detected by the location sensor), the ARD may determine that the user is carrying the item. In such case, the ARD may transmit a signal to the AR control server to update the status of that particular item to "carried". Alternatively or additionally, if the scanners located around the retail space detect that the location of item has changed (e.g., by changes in proximity to various scanners) and continues to change in a relatively short time interval (i.e., the item is not simply moved from the shelf to, for example, a display area), such data may be transmitted from the scanners to the AR control server, and the status of that item may be changed to "carried". In addition to the status change, the location of the item may be updated in the AR control server database.

In some retail spaces, a plurality of RFID scanners or readers (or other types of information readers) may be positioned at various locations in the space, and may be in communication with the AR system control server. For example, these additional RFID scanners may be placed at the entrance(s) and/or exit(s) of the retail location. When a user exits a retail location, an RFID scanner located at an exit may identify the item(s) carried by the user by detecting the RFID tag. Once the item(s) have been identified, the identification data may be transmitted to the AR system control server to determine whether the item(s) have been purchased. In particular, the IDs (e.g., GUIDs) of these items may be captured by a RFID scanner and compared with the IDs in the MIS database(s), which may contain data similar to the data stored in the tables and data structures of FIGS. 6A-6E, as will be explain further below. If the MIS database indicates that a particular item has been purchased (e.g., having a "purchased" status in the data table of FIG. 6B, or based on the item data structure of FIG. 6E), then no notifications or alerts may be provided to the user or the merchant. On the contrary, if the MIS database indicates that a particular item has not been purchased, a notification may be transmitted to the user's ARD, which may in turn provide a purchase prompt to pay for the item(s). Alternatively or additionally, unpurchased items detected near an exit may be detected by a scanner, and a notification (e.g., alert) may be transmitted from the MIS to the merchant (e.g., a sales associate ARD). In some variations, if an unpurchased item carried by a user is detected by a scanner at or near an exit (or in some cases, where the item has left the retail location), the scanner may transmit the item ID to the MIS, which may then automatically charge the user's payment account using pre-stored payment information (e.g., stored in the ARD or a control server database). A notification from the MIS may be sent to the user's ARD to indicate that a purchase transaction has occurred due to their possession of previously unpurchased items.

In some variations, a retail location may have a checkout area where any unpurchased items in the possession of a user who has entered the checkout area may be processed for purchasing. One or more checkout areas may be located near the entrances/exits of a retail location, or throughout the retail location. One or more RFID scanners or readers may be located within these checkout areas to help facilitate the detection of unpurchased items. In some variations, processing an item for purchasing may comprise transmitting a signal from a RFID reader to the user's ARD or AR system control server that identifies the item, determining whether that item has been purchased by retrieving the status of the item in the ARD or AR system control server database, and then generating a notification to the user ARD to that prompts the user to initiate the purchase process. The user may then respond to the ARD notification by providing a confirmation of purchase, and payment for the item may be handled by the MIS and/or a payment system that is in communication with the AR system control server. In some variations, a user may set a preference such that when they enter a checkout area, any carried unpurchased items are automatically processed for purchasing without additional confirmation from the user, and upon completion of the purchase process, the control server may send a notification to the user's ARD as a confirmation of purchase/payment. Once an item has been purchased, data regarding the details of the purchase (e.g., item identification, purchase price, time, and any user-specific data that has been released by the user) may be sent to the MIS to update an inventory database (e.g., to remove a purchased item from the merchant's inventory database, such as the database of FIG. 6A and/or a merchant revenue database, such as the database of FIG. 6D).

Additionally or alternatively, a user's ARD may be configured to report to both the user and the merchant when the user has departed the retail location. The user's ARD may send a signal to the AR system control server that includes the identity of the items in the user's possession (i.e., carried), and based on the databases of the AR system control server (e.g., MIS) and/or the user's ARD, the user and/or merchant may be notified of which items have not been purchased by the user, but are in the user's possession (e.g., "carried"). For example, the AR system control server (e.g., MIS) may generate an alarm message that is transmitted to the user ARD and/or merchant (e.g., merchant ARD, a sound system in the retail location that generates an audible alarm). Information about the unpurchased items in the user's possession may be immediately relayed to the store employee's ARD to make them aware of the items and/or the user that triggered the alarm so that appropriate action can be taken.

Offer Negotiation Server

Some variations of an AR system control server may comprise an offer negotiation server (ONS). An ONS may be maintained independently from the ARD and/or MIS, and may be wirelessly accessible by the ARD via internet connectivity. In some variations, the ONS may be identified, e.g. by a standard uniform resource locator (URL), such as http://ons.organization.com or ons://ons.organization.com. In these examples, either http is specified as a transport protocol, or a novel protocol specifically intended for the ONS interaction. The ONS may require the user and/or ARD to provide additional authentication information prior to forming a data connection, and the connection to the ONS may be secured in the manner of Transaction Layer Security (TLS) or another method. ONS information and login credentials, if necessary, may be provided for a pre-paired (e.g., default) ONS at provisioning time of the device or at the time of installation of a purchase or shopping application on the ARD. Similarly, ONS information and login credentials, if necessary, may be added, deleted, or modified via the user interface on the ARD. In some variations, the ONS may store information regarding the features of the product being considered by the user, pricing of the same product at the retail location where the user is currently located, at other nearby retail locations, and/or at an online retailer, and provide such information to an ARD. The ONS may also present offers provided by EPs to the user. When the user is at a particular retail location, the user may receive offers from the ONS that originate from an EP that is a merchant in competition with the merchant of the particular retail location. Alternatively or additionally, the user may receive an offer from the ONS that originates from an EP that is affiliated with the merchant at that particular retail location. In some variations, the ONS may display a ranked list of products in the same category as the target product, where the ranking is determined by user reviews aggregated by the ONS or an EP. Optionally, the ONS may have information stored regarding the inventory of the target product and the suggested products, as well as the location of the inventory. For example, the ONS may have inventory data indicating that the target product and/or suggested products are in stock at an alternate location near the user, and may offer to sell the same or similar product at the alternate location. If the ONS determines that the user is interested in a product that is out of stock at the current retail location, then information may be provided about ordering, restocking dates, or discounts or other incentives offered to the customer willing to pick up the product, or have it shipped to them, at a later date.

In one variation, the ONS may comprise a database library of offers, where each of the offers may be indexed by a common or standard identification system. For example, the offers may be indexed by bar code, serial number, model number, etc. Alternatively or additionally, offers may be indexed or clustered by category and/or price. A TI object generated by an ARD may contain such product identification information, and the ONS may be configured to extract this information from the TI and use it to select an offer from its database.

Figure 3A:
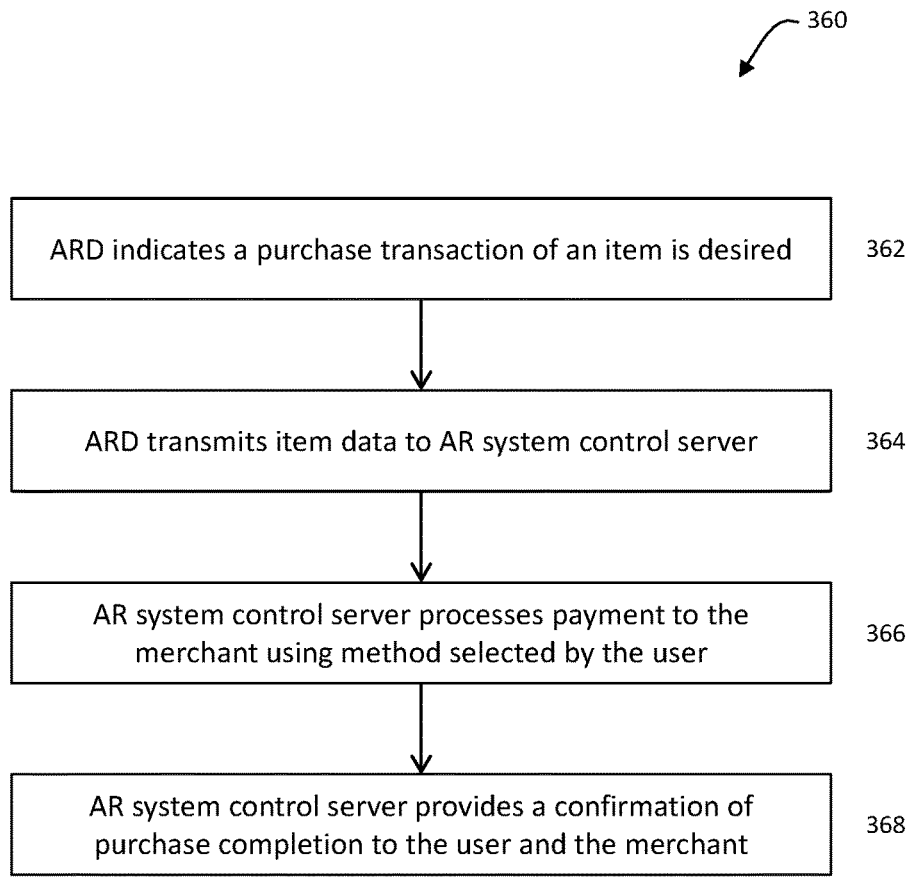
FIG. 3A is a flowchart representation of one variation of a method for purchasing items using an AR system at a retail location.
Figure 3B:
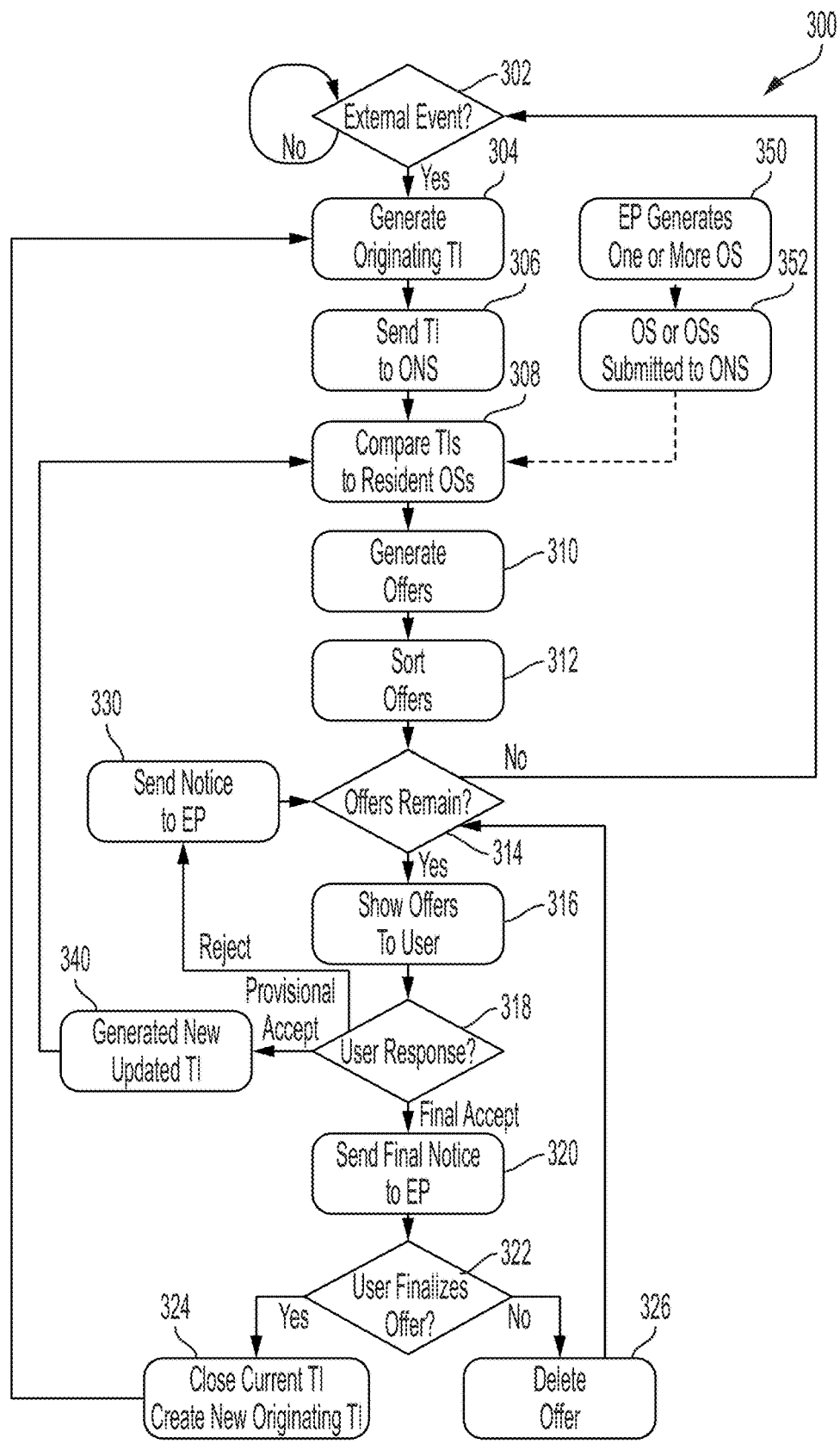
FIG. 3B is a flowchart representation of one variation of a method that may be used with an augmented reality system involved with suggesting purchase alternatives to a user.

One example of a method that may be performed by an AR system when a user considering a target for purchase is depicted in the flow diagram of FIG. 3. The AR system may comprise an ONS, which may have a computer or controller that is configured to implement one or more of the steps in the method 300. When the ARD detects a potential purchase event 302, the ARD may initiate the negotiation interval. During the negotiation interval, the ARD may generate 304 a TI object and send 306 the TI object to the ONS. The ONS may then compare 308 the properties of the TI object (e.g., serial number, pricing, etc.) to offer scripts that have been stored on its database. Offer scripts may have been generated 350 by one or more EPs, and then submitted 352 to the ONS. Various search and compare algorithms may be used to match TIs and OSs. After one or more OSs have been identified as being relevant to a particular TI, one or more offers may be generated by the OSs. The ONS may then sort 312 the generated offers based on a variety of parameters, for example, paid sponsorship of a particular OS by a particular EP, by lowest or highest price, by earliest or latest delivery dates, and/or by any user-specified preferences. For example, users may wish to see offers from only a certain type of EP (e.g., eco-friendly EPs, fair-trade, EPs, etc.), and/or may wish to block offers from other EPs (e.g., EPs that have spammed them in the past, EPs that the user wishes to boycott for personal reasons, etc.). Users may also wish to see only certain types of offers, for example, offers for the target at a lower price and with immediate delivery or same-day acquisition (and not offers that can provide a lower price but delayed delivery). Alternatively or additionally, offers may be sorted according to value criteria, which may indicate that certain types of offers may be more interesting to the user than other types of offers. The value criteria may be selected by the user and/or generated by a computer-implemented method based on prior actions of the user. For example, offers may be sorted by price, and/or relevance, and/or average user rating, etc., and the user may select the manner in which the offers are sorted. In some variations, the offers may be sorted and presented to the user according to how the user has preferred to see the offers in the past, and/or their demographic information. The ONS may then determine 314 whether any offer remain after the sort and filter step 312. If offers remain, they may be presented 316 to the user via a transmission to the user's ARD. After the offer is presented, the user has the option to respond 318 by finally accepting, provisionally accepting and/or rejecting the offer. If the user accepts the finally accepts the offer, the ONS may send a notice 320 to the EP to inform them that their offer has been accepted. Optionally, the ONS may ask the user to re-confirm 322 their acceptance of the offer. The user may then complete 322 the transaction (e.g., confirm payment and delivery details) using the ONS as the intermediary between the user and the EP, or the ONS may put the user in direct communication with the EP, and the user may then interact with the EP to complete the transaction. Once the transaction is completed, the negotiation interval is closed and the current TI is closed or deleted 324. If the user chooses not to finalize the offer and complete the transaction, the offer may be deleted 326. Data related to purchased products may be used to the update the databases and data structures of FIGS. 6A-6E.

Alternatively, the user may provisionally accept the offer at step 318, and the ARD may then generate 340 a second instance of a TI object. This TI object may have the same properties (e.g., serial number, price) as the first TI object, but one or more of the properties may have different values. For example, the price of the second TI object may be lower than the price of the first TI object. The second TI object may then be compared to other OS in the ONS, as in step 308. This loop may be iterated as many times as desired by the user.

The user may also have the option of rejecting a particular offer at step 318. Optionally, the ONS may send a notice 330 to the EP to inform them that an offer was rejected. The ONS may then return to the list of offers that remain at step 314 and present alternate offers to the user.

Merchant Inventory System

The MIS of an AR system control server may be programmed to track the items carried by a shopper and process transactions associated with the one or more items offered by the merchant. The MIS may be maintained by either the merchant or an agent thereof. A user ARD may transmit information to the MIS, for example, information regarding the location and identity of the user ARD (which may correspond to the location and identity of the user), a list of items associated with the user, and if the user is currently at a retail location, a store ID (or merchant ID) corresponding to the merchant at that retail location. As described above, the MIS may also track the status (e.g., "carried" or "purchased") of each of the items associated with the user. When the user selects an item for purchase, the MIS may access the user's payment information to complete the transaction. The user's payment information may be transmitted by the user ARD at the time that the purchase is desired, and/or may be authorized by the user in advance of the purchase. Payment information may include, for example, the user's credit card/debit card information, PAYPAL™ account, and any other types of information that can be used for completing a purchase transaction. In some variations, a purchase transaction may be handled by a separate module (e.g., a payment system or server), and upon completion of the purchase transaction, the identity, price, quantity, etc. of the purchased items may be transmitted to the MIS to update product inventory databases.

The MIS may also track the location and the status (e.g., purchased or not, carried or not) of all of the items in the retail space. The location and status of the items may be transmitted to the retail associates in the retail space. Such information may help associates take appropriate action, such as provide assistance regarding the use or purchase of an item, recommend the purchase of other related items, etc. In one variation, the retail associates may also have an ARD (e.g., merchant ARD) that may be configured to display information about the location and status of the items in the retail location overlaid on a map or floor plan of the retail location. Optionally, the physical location of any shoppers within the retail location may be overlaid on the map or floor plan. The information about the items and the location of any shoppers may be obtained from shopper ARDs, AR system control server databases (e.g., associated with the MIS and/or ONS), as well as scanners, readers, and/or cameras located throughout the retail space.

Figures 6A, 6B, 6C, 6D, 6E:
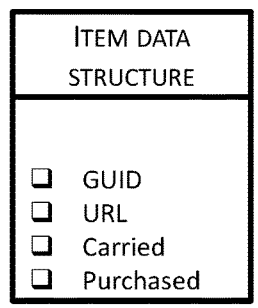
FIGS. 6A-6D depict variations of tables or databases that may be stored in the memory of an augmented reality system control server (e.g., in a merchant inventory system or server) and/or a computational component of an ARD.
FIG. 6E depicts a representation of an item data structure object.

The memory of an AR system control server may optionally comprise one or more databases that may include information about the shoppers located within the retail space of a merchant and items that are in possession of the shoppers. Some examples of databases are depicted in FIGS. 6A-6D. Such databases may be maintained with the MIS, or a separate system within the AR control server. In some variations, all or some of the information in the databases of FIGS. 6A-6D may be optionally stored in the computation component of the ARD. Examples of databases and information that may be stored and updated in the MIS are depicted in FIGS. 6A-6E. FIG. 6A depicts one variation of an inventory database that contains the identity and quantity of items in the possession of the merchant (i.e., not carried or purchased by a user). FIG. 6B is one variation of a database that contains the specific instance(s) of item(s) in the possession of a user (i.e., item is not on the shelf and/or is carried by a user and/or is purchased by a user), the status of the item(s), and the location of the item(s). FIG. 6C is another variation of a database that tracks the specific instance(s) of item(s) in the possession of a user, for example, item instance ID, customer ID, and location data. Some databases may not include customer ID data, the preserve the privacy of the shoppers in the retail location, if so desired. The databases of FIGS. 6B and 6C may each comprise an array or hash table of individual item data structures that are each instantiated when a particular item is in the possession of a user (e.g., picked up from the shelf and put into the user's cart, as detected by the user ARD and communicated to the control server/MIS). An item data structure or object may comprise properties such as the item GUID, URL to the MIS, carry status, and purchase status, as is depicted in FIG. 6E. Such properties may be queried by the MIS upon request by a merchant ARD and/or a user ARD when the user indicates that they would like to purchase the item(s). Optionally, one or more of the databases of the MIS may contain user location data mapped to the items carried by the user so that if the user leaves the retail location without purchasing the carried items, the user and/or the merchant may be notified. FIG. 6D depicts one variation of a purchased database that may be included in a MIS. The purchased database may contain the identity and/or instance of item(s) purchased by a user and the sale price. The data in these databases may be updated by other control systems (e.g., a third party purchase system, ONS), as well as data from user ARDs, merchant ARDs, retail location purchase consoles, scanners located in the retail location, etc. Similarly, any of these devices may query the MIS for data contained in these databases, where the access to the data is regulated and monitored by the merchant (i.e., user ARDs may have no access to these databases, while merchant ARD may have full access, third party purchase system may provide data for updating the MIS databases, but may not have permissions to read data from these databases).

When the AR device of a shopper captures information from the item identification tag of an item of that the shopper has picked up or procured, a record of the item may be established at the ARD and/or transmitted to a AR system control server (e.g., MIS 104a in FIG. 1A) at a location identified by the network address (e.g., URL) encoded on the tag. The item can be identified by the item ID captured from the tag. The databases of FIGS. 6B and 6C may be populated as one or more shoppers each having an ARD peruse the store and procure items for purchase. In some variations, an entry for an item may not be instantiated in the database until the AR system has determined that the shopper is carrying the item. The database may include, for each item, a customer ID identifying the shopper (or the specific ARD associated with each shopper), an item ID identifying the item that was viewed or carried using the ARD of a particular shopper, a status associated with the item(s) carried by the shopper, and the location of each item. It should be understood that additional columns can be included in database of FIGS. 6B and 6C to track other information relating to the shoppers and/or items. In some variations, a database may include customer ID, item ID and status, without indicating the actual location of the item. Multiple shoppers and the items they carry or purchase may be tracked in an AR system control server database similar to the one depicted in FIGS. 6B and 6C. Merchants may use this data to obtain real-time data on item inventory and sales. The MIS may also manage and store other databases and tables, such as product inventory databases of other retail locations administered by the same merchant, revenue and/or expenditures databases, etc.

In some variations, the list of carried items (their item IDs or just the fact that unpurchased items are identified as "carried") may be continuously (or periodically) presented on the user ARD as he/she continues to browse the retail location. The user ARD may also provide a checkout option to the shopper so that the shopper can complete the purchase of one or more of the carried item at any time while still in the store.

In one variation, when the tag associated with an item is read, the user ARD may prompt the shopper to purchase the item. For example, the user ARD may present on a display a purchase screen that allows a user to select the item for purchase, and/or may display representations of all the items that are in the possession of the user that have not yet been purchased. The user may then select and/or authorize the payment of one or more of the items displayed by the ARD. Optionally, the ARD may prompt the user for payment information and transmit the payment information along with other information (e.g., customer ID, item ID, status) associated with the purchase to the AR system control server for processing. Purchase transaction processing may, in some variations, be carried out by a third-party purchasing system. When the transaction is successfully processed by the server the status of the item in the databases and/or data structures of FIGS. 6A-6E can be revised to "purchased." In another variation, as soon as the presence of the item is detected away from its original location, the AR system control server may automatically initiate a purchase transaction and may transmit a signal to the user ARD to obtain authorization for the server to complete the transaction. If the user subsequently returns the item to its original location and walks away from it, the AR system control service may automatically initiate a return transaction and may transmit a signal to the user ARD to obtain authorization for the server to complete the return/refund transaction.

If the user chooses not to select the item for purchase or if the user places the item outside of the range of the RFID reader of the user ARD (e.g., back to the shelf), the item can be determined to be no longer "carried" and removed from the list of items being tracked in the data tables of FIGS. 6B and 6C, and added back into the table of FIG. 6A. Optionally, when the item is removed from the list of "carried" items, the user ARD may display alternative items for purchase to the shopper, as described elsewhere in this document. Also, when an item is no longer "carried" and it was last seen at a location other than its original location, a notification can be sent to store personnel to place the item at its correct sale location in the store.

Purchasing of Items

FIG. 3A is a flow chart illustrating the exemplary steps in a method 360 of facilitating a purchase transaction, according to a variation of the disclosed system. The method 360 may comprise the user ARD indicating (step 362) to the AR system control server that a purchase transaction of an item is to be initiated. The initiation of the purchase transaction may originate from user input (e.g., voice indication or affirmation, tactile indication by pressing a button on the ARD or totem, user gestures detected by the ARD, etc.). In some variations, a purchase transaction may be initiated by the geolocation data of the user. For example, the user may walk into a checkout region of the retail location, and upon detection of the user in the checkout region, the ARD may indicate to the AR control server that a purchase transaction is to be initiated. In some variations, if the user exits the store with unpurchased items in their possession, the AR system (e.g., the control server and/or the user ARD and/or any merchant ARD) may automatically initiate a purchase transaction for those items. Alternatively or additionally, the user ARD and/or AR system controller (e.g., MIS) may periodically prompt the user to purchase items that are in their possession (e.g., every 15 minutes, after the user has reached a threshold number of unpurchased items in their possession, if the user is detected as nearing an exit of the retail location, etc.). Method 350 may further comprise the user ARD transmitting (step 364) data about the item to the AR system control server. Item data may include, for instance, item identification, price, quantity, etc. The user ARD may also transmit the user's ID to the AR system control server so that the user's payment preferences and methods (if any) may be obtained from a database. In some variations, the MIS of the AR system control server may receive the item and user data from the ARD. Alternatively or additionally, a separate payment system of the AR system control server may receive the item and user data from the ARD. Method 360 may then comprise the AR system control server (e.g., MIS or payment system) providing (step 366) payment to the merchant from the user. Such payment may be carried out in accordance with user-selected preferences, and/or any suitable payment method (e.g., credit card, debit card, gift card, or any online payment service such as PAYPAL™). Once payment is completed, the AR system control server (e.g., MIS) may generate a confirmation notification (step 368) and transmit that notification to the user ARD. The MIS may also update its inventory databases to reflect the purchase of the item (e.g., decrease the item count, increase funds to the merchant account, etc.). The database that contains the status of the items at a retail location may be updated, for example, to change the status of the item to "purchased". For example, upon the completion of the purchase of an item, the database of FIG. 6B may be updated such that the status of the purchased item is changed to "purchased", and the instance of the data structure for that item may be updated such that the "purchased" property is affirmed (e.g., assigned a value of "1", where a value of "0" or null would indicate the item is not purchased). To the extent that databases and/or data structures analogous to the ones in FIGS. 6B and 6E are maintained in the user ARD, such are also similarly updated. The database of FIG. 6E may be updated with the item ID of the purchased item and its purchase price.

Offers

A variety of offers may be presented to the user by the ONS. For example, one type of offer may be an option to purchase the target product at a discount. In some variations, the ONS may offer the user an alternative product for purchase, where the alternate product may be a competing product, and may be available for purchase at the current retail location, at a nearby retail location, and/or at an online retailer. Offers may also present or suggest additional products for purchase, for example, related or correlated products that are available for purchase at the current retail location, at a nearby retail location, and/or at an online retailer. Correlated products are products that are typically purchased along with the target products, regardless of whether the correlated product is in the same category as the target product. For example, shoppers who purchase a portable music player may also be likely to purchase a protective case for the music player, or shoppers who purchase baby teething toys may also be likely to purchase toddler toothbrushes and children's books on tooth brushing. Such correlated products may be identified by data analytical methods (e.g., aggregated and/or computed by the ONS or an EP) and presented to the user as suggested items for purchase. In addition to feature and pricing information of the product at hand and related products, the ONS may also include offers or options to purchase the target product(s), competing or alternate product(s), and/or correlated product(s). In one variation, an offer provided by an EP may be an enticement to visit a web page or get more information from the reviewer (possibly including advertising material for yet other parties advertising through the reviewer). Offers may also present the user with the option of purchasing the target product(s) and/or correlated product(s) immediately, but receiving the purchased product(s) at a later time, for example, having the product(s) shipped to the user's home, or picked up from the merchant at a later time.

Figure 4:
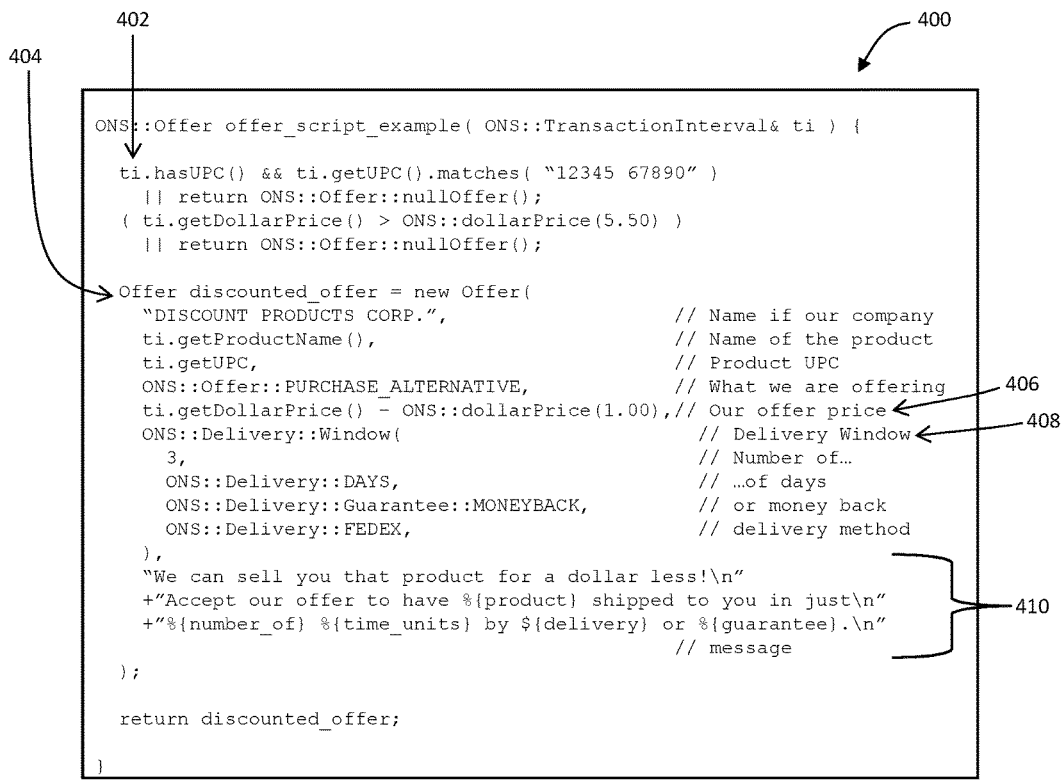
FIG. 4 is a pseudo-code representation of a computer-implemented method that may be used to generate an offer.

One example of an offer object and ONS script is represented in pseudo-code (i.e., a C-like language) in FIG. 4. In the ONS script, an example API is used to query information about the TI object. The TI object may be created by the ARD upon determining that the user is considering the target product for purchase, and may possess a plurality of properties, including but not limited to, Universal Product Code or UPC number, QR code, serial number, model number, price, and the like. The ONS script may be tailored to identify TI objects with a particular UPC number or dollar amount. If a TI object matches the UPC number and/or price condition (e.g., the price of the TI object is greater than a price threshold), the OS may generate an offer to the user. In the example OS 400 of FIG. 4, the OS 400 may offer a lower price if it determines that the target product (which is in this case identified by UPC) is above a pre-specified price (in this case $5.50). This may be performed by the OS by querying the TI object 402 to extract its UPC and price properties. Once a TI 3402 has been received by the ONS, the ONS will process that TI 402 according to the plurality of OSs provided by the EPs (of which OS 400 is an example). The OS may be implemented in a standard computer language, or it may be implemented in a specialized language designed for the purpose. If the former case, a standard API will allow scripts or programs to access information about a given TI.

As seen in FIG. 4, the output of the OS is an offer object 404 (in this example, the particular instant of the Offer object is called "discounted offer"). This is a data structure which contains the specifics of what the EP is willing to do for the user. In this example, the EP is offering an identical product at a lower price 406, if the user will agree to have it delivered to their home in the near future 408. The offer specifies important details of the agreement, such as the number of days within which the product will be delivered, the method of delivery, and the associated guarantee (i.e. what the vendor will do if the product does not arrive on time). In this example, the offer also contains a message 410 which is intended to accompany the offer when it is presented to the user. This message may be limited by the ONS in length. Other content restrictions may also be provided, such as to eliminate inappropriate content or language which might be associated with spam or phishing attempts.

Once the offer has been sent by the ONS to the ARD, the user is presented with the offer in the context of the target. This may mean, for example, that the offer is presented virtually in the proximity of the target, and the target may be called out in some way, such as with highlight, outline, glow, or encircled visually. Additional details about the appearance of an offer and how it is presented to the user is described further below.

Once presented, the user may choose to accept the offer or to ignore it. If the offer is accepted, the interval will be closed immediately. Alternatively, the offer may be accepted provisionally. In the latter case, a new TI is sent out indicating the state of the new situation the user is in. In the case of the example in FIG. 4, after provisional acceptance the new TI would indicate that the user was considering an offer from "DISCOUNT PRODUCTS CORP." at a price of $5.50 and three day delivery. During the period between provisional acceptance and final acceptance, new offers may arrive from other vendors, or even from a prior vendor in the TI history.

An individual TI may make reference to prior TIs, or it may simply contain all of the information necessary to retain from prior TIs in the chain originating from some particular new TI. In the latter case, the first TI which was created by the ARD in response to some event (other than the acceptance of an Offer) is called the Originating TI. In some variations, a particular instant of a TI or offer object may store information about other TI or offer objects that have been instantiated by other EPs or users. A user may indicate through their ARD the degree to which they wish to be made aware of other offers, and/or other users in the same geographical area who are considering similar targets and/or offers.

Notices

When a user accepts an offer, either provisionally or finally, or when the user rejects an offer, either explicitly through UI action, or implicitly by ignoring it for some period of time, or by rejecting the entire context (i.e. by leaving the original target or engaging with a new target), a data structure and/or packet, for example, a notice object, is instantiated by and sent from the ARD to the ONS. When a user indicates that they would like to accept a purchase offer provided by the ONS (e.g., via signaling through the user's ARD), the data regarding the offer (e.g., item or service ID, pricing, etc.) may be transmitted to the EP from which the offer originated and/or MIS of that EP. The MIS of that EP may update their internal databases to reflect the purchase (e.g., the item quantity in the inventory database of FIG. 6A may be decremented, the purchased item and its price may be entered in the purchased database of FIG. 6D, etc.). Optionally, the AR control system and local memory and databases may be updated with item and purchase data when the user accepts or purchases an offer. Such local data may be used for generating reports and statistics as may be desired by the user.

This notice object will then be transmitted by the ONS to the EP along with the offer to which it is a response. The EP may use this information to generate a new Offer specifically tailored to the circumstance, which can then be delivered by the ONS to the user by reference to the Notice. Alternatively, in the case where the notice is an acceptance, it will contain the necessary information required to complete the transaction with the EP.

Notices are the objects in the system that may potentially contain identifying information. If present, this information may be removed by the ONS before the notice is passed to the EP, in accordance with the privacy settings set by the user. However, in the circumstance where an offer is accepted finally, the notice object may include user identifying information. In this special case, all necessary information to close the transaction is shared.

Offer Presentation

Figure 5A:
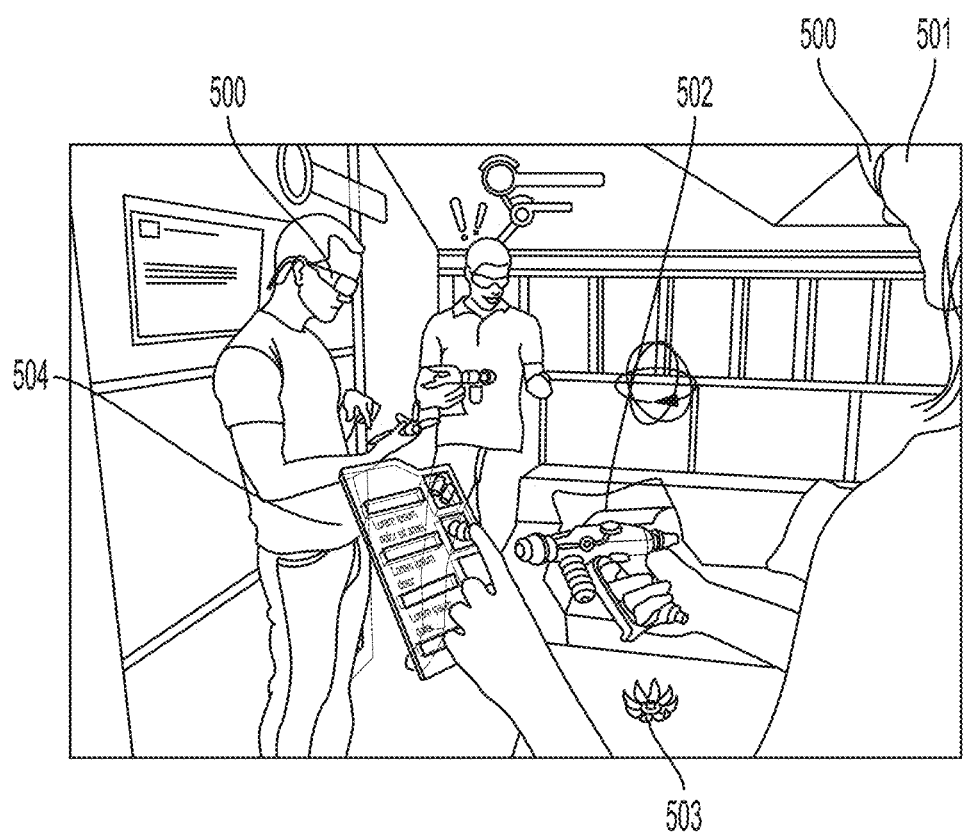
FIGS. 5A-5G depict various scenarios in which an augmented reality system may provide offers to purchase goods and services to a user.

Offers may appear to the user in a variety of forms, depending on the user's ARD. Examples of how an offer may be presented to a user by their ARD are depicted in FIGS. 5A-5G. FIG. 5A depicts a user 501 in a retail location examining a target product, toy 502. The user 501 is wearing an ARD 500 (which may be better seen as worn by another patron in FIG. 5A). The ARD 500 may optionally be paired with a totem 503. As the user 501 is examining the toy 502 (and possibly considering whether to purchase it), the ARD 501 presents an offer 504 to the user. The offer 504 may be any type, as described herein, and may be an offer originating from an EP affiliated with a competing merchant. An offer from a competing merchant may prompt the user to depart the immediate retail location and visit the competing merchant (which may be at a different physical location or on a website). If the user decides to accept any of the offers presented by the ARD 501, they may indicate their intent using a hand, finger, or other gesture.

Figure 5B:
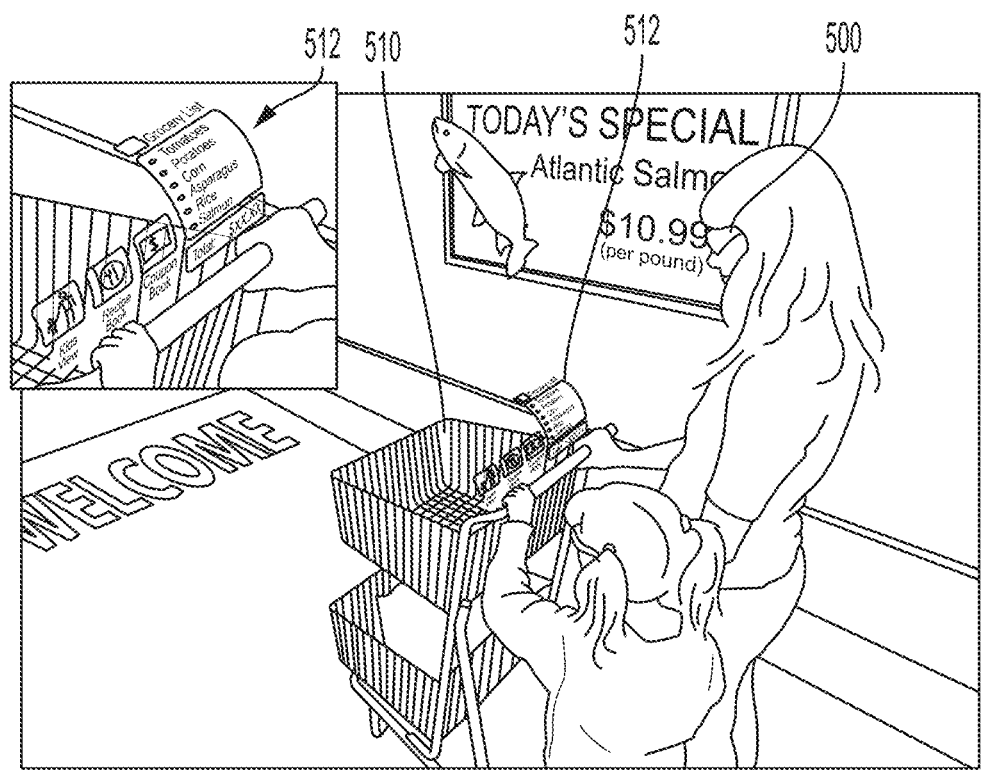
Figure 5C:
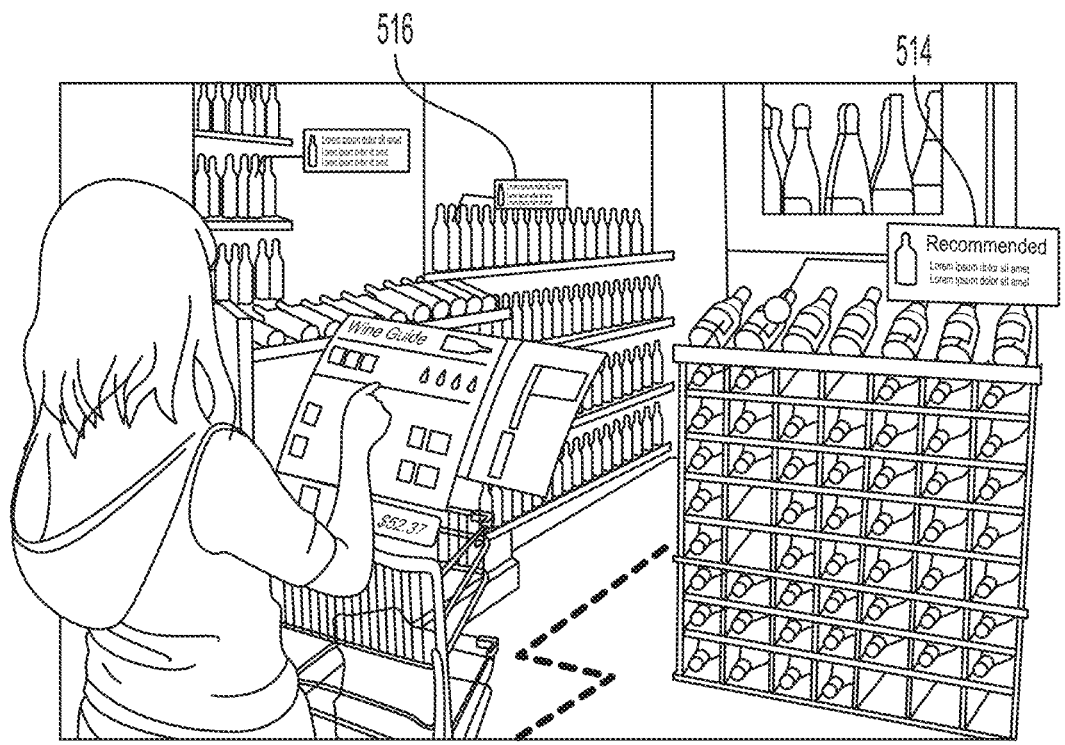

FIGS. 5B and 5C depict another way in which an AR system may present an offer to a user. As depicted there, the ARD 500 may display an offer 512 above the shopping cart 510, where the offer 512 may provide suggested purchases based on the user's shopping list. The offer 512 may be presented in addition to any reminders the ARD may provide to the user regarding their shopping list. As the user peruses the retail location (e.g., grocery market) for the items on the shopping list, the ARD may also provide recommendations 514, 516 of various products, prompting the user to direct their attention to those products on the shelves, as shown in FIG. 5C. These offers 514, 516 may provide suggestions to purchase items that are in-stock and available at the retail location.

Figure 5D:
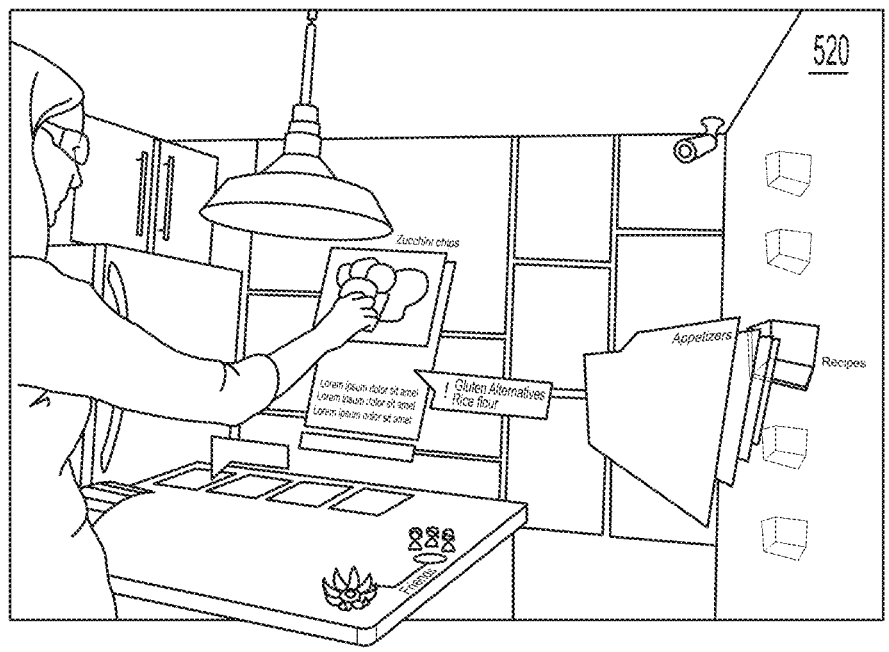
Figure 5E:
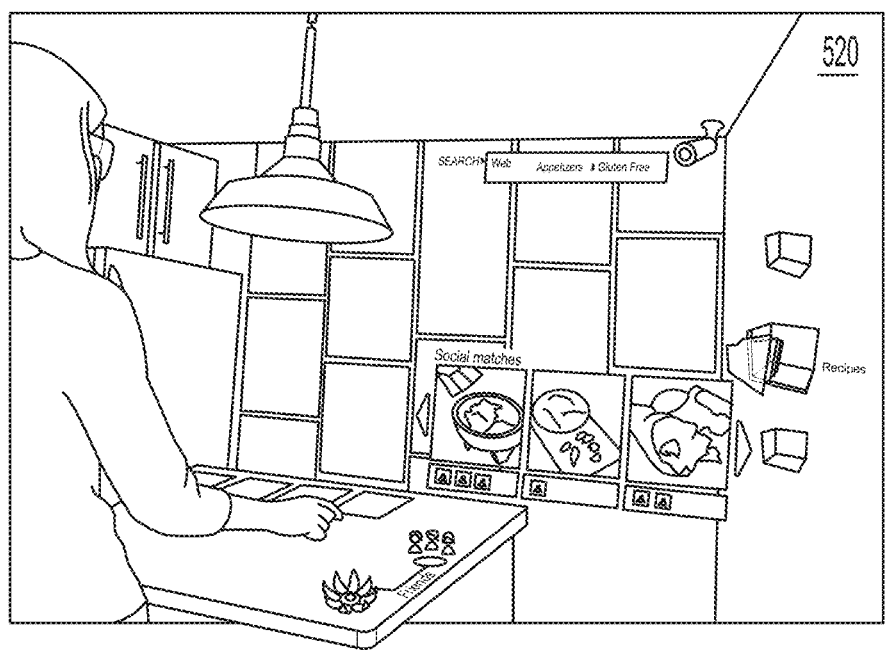
Figure 5F:
Figure 5G:
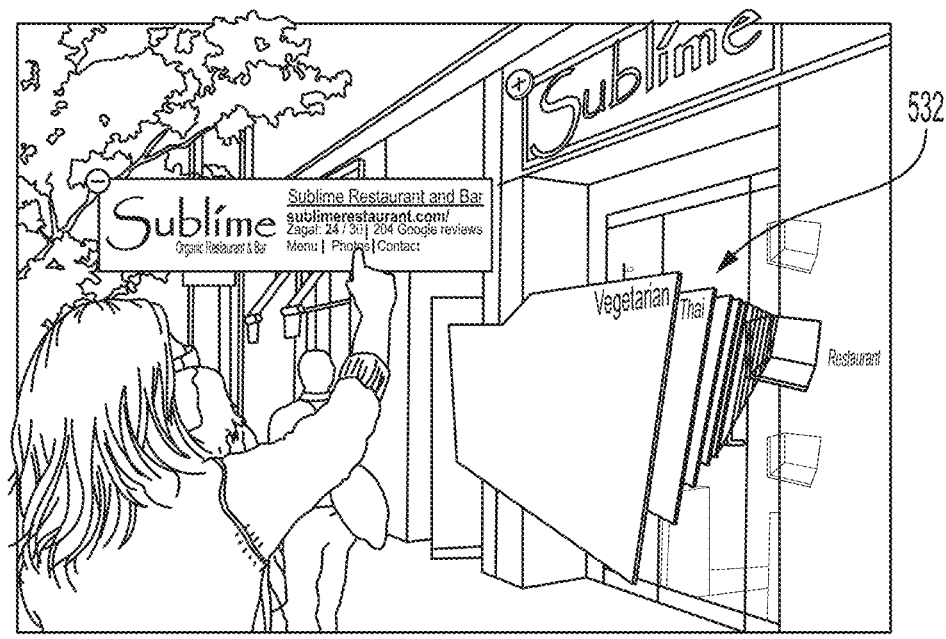

FIGS. 5D and 5E depict another variation of offers that may be presented to a user, for example, at a restaurant 520. The user may select an entrée (FIG. 5D) and the AR system may suggest a wine, appetizer, and/or side dishes that complement the main entrée (FIG. 5E). In some variations, an AR system may be able to present suggested products and services for purchase by a user as they stop or slow down near to the retail location. That is, the user need not enter the retail location before the AR system, but certain cues (e.g., slowing pace, gazing towards the storefront, pointing to the store, whether the time of day is approaching a meal time, etc.) may indicate that the user is considering whether to purchase the goods or services sold at that venue. FIGS. 5F and 5G depict a user approaching the entrance of a restaurant 530. In FIG. 5F, the AR may recognize the hand gesture pointing to the signage of the restaurant and interpret that as an indication that the negotiation interval has begun. FIG. 5G depicts offers 532 that may be presented to the user, perhaps displaying the specials of the day, appetizers and/or side dishes and/or wine that pair with the specials, etc. The user may indicate their interest in that restaurant via hand or finger gestures. While the presentation of an offer may occur before the user enters the restaurant, it should be understood that the presentation of an offer may also occur before the user enters retail locations and/or other service locations, such as a beauty salon, mechanics shop, etc.

An ONS may store data regarding merchants of all types (e.g., merchants that have an online store, merchants that a physical retail location, and merchants that have both), merchant data (e.g., physical and/or virtual location of the merchant and/or retail location, types of inventory bought or sold, etc.), information on products and services of all types (e.g., product features, physical appearance and attributes of the product and/or packaging, prices, etc.), and shopper data (e.g., demographic data, personal shopping lists, purchase history and patterns, budget and/or financial profile, etc.). Such data is cross-indexed so that merchants can collect data analytics (subject to the privacy setting approved by the user) on the types of shoppers they attract and products sold, and shoppers can compare prices across different merchants and select and/or purchase items or services within their desired budget and in accordance with their needs. This information may also be used by the ONS and/or an EP to dynamically formulate offers that may be presented to the user on their ARD as the user peruses the products at a retail location.

While shopper data in the ONS may be acquired by the AR system through various sensors on the wearable ARD and the history of interactions between the user and the AR system, merchant data and product data may be provided by external parties (EPs). EPs may be merchants (with or without a web-based store), advertisers, personal shoppers, and the like. The types of data provided by EPs to an operator of the ONS may include a listing of all the products being sold, product features, product prices, inventory, physical location of the inventory (e.g., warehouse), physical location of a retail store, any promotional events or special pricing to incentivize a shopper to purchase one or more of their products. Such data may be provided to an operator of the ONS by digital transfer between the ONS server and EP data server, or data entry (e.g., via spreadsheet), verbal communication, and/or other similar means. The operator of the ONS may prescreen EPs or their individual offers and only accept data from EPs that meet a particular quality standard. For example, the ONS may only accept data from EPs that are affiliated with a certain type or category of merchants, and/or may only accept merchant and/or product data that is sufficiently detailed to be useful to a user.

Any sort of information about the target product may be shared from a user's ARD with the ONS or the EPs. In particular, the price of the target product or the name of the merchant selling the target product may be shared. In some variations, information about the merchant (e.g., their founders, product philosophy and genesis, etc.) may also be stored on the ONS and accessible to a user. For example, users may be able to select offers only from merchants that prioritize ecological and sustainable practices in their hiring, sourcing, and supply chain management processes. In some variations, the EP may also provide data to the ONS that may help the ONS and/or the ARD to identify the products that they sell. Such data may include serial numbers, bar codes, QR codes, physical attributes of the product and/or product packaging (e.g., color, size, geometry, material, optical characteristics, etc.), and the like. In some variations, the ONS may be able to recognize a product using an image processing unit (IPU), which may convert the pixels of an image into features. EPs may provide feature lists of the products they sell and the ONS may match the product features from the EPs with the features generated by the IPU to identify a product.

Shopping settings and preferences may be set by the user via their ARD which may be resident on the ARD or stored in the ONS. For example, the user may create a list of EPs they wish to do business with, or that they wish to block. When an offer appears from the ONS, the offer may indicate the EP from which it originates, and the user may have the opportunity to block that particular EP thereafter. The user may also create a list of the types of offers they wish to receive, or that they do not wish to receive, as well as the frequency and conditions under which they would like to receive offers. For example, the user may only wish to see offers that include a price discount on the target product, but not to see offers that suggest the same or related products at a higher price point (e.g., an offer from a competing merchant, or an offer for the purchase of a bundle or kit that includes multiple related products, including the target product). In some variations, the user may specify they would only like to receive offers once when they enter a retail location, and not receive offers on every product they examine (e.g., only receive offers on products on their shopping list, but no offers on other products after the initial offer when they entered the retail space). The user may also mark certain types of offers, and/or offers from certain types of merchants to be SPAM. The ONS may remove an EP and/or affiliated merchant if multiple users identify offers from the EP or merchant as SPAM.

Various types of information about the user may be shared from their ARD with the ONS and/or the EPs. For example, demographic information (e.g., age, gender, and ethnicity), purchase habits, history and preferences, shopping lists and the like may be shared with the ONS and/or the EPs. In some variations, the age of the user may be shared between the ONS and the EPs for the purpose of screening out EP offers which are illegal or inappropriate for minors or other shopper groups (e.g., the advertisement of alcohol or cigarettes to minors). A user may also opt out of the sharing of certain information with the ONS and/or EPs.

EXAMPLE

An illustrative example of a retail shopping experience is described below. A user wearing an ARD enters a retail location. The user expresses interest in a hand-held vacuum cleaner. The user's ARD detects this interest (using any of the methods described above) and transmits a signal to the ONS indicating that the user is interested in this particular model of hand-held vacuum cleaner. The ONS transmits a data to the ARD regarding an offer for the same vacuum at a lower price, to be shipped at a later date. The user rejects this offer and the ARD send this rejection notice to the ONS. The ONS then provides an offer to the user to purchase vacuum bags compatible for this vacuum, to be shipped at a later date. The user tentatively accepts this offer and the ARD stores data relating to this offer in its local database. The user picks up the hand-held vacuum and puts it in their cart. The ARD sends a signal to the MIS with data about this hand-held vacuum (e.g., GUID, quantity, and/or location of the vacuum and/or the user, etc.). The MIS decrements the merchant inventory database (e.g., FIG. 6A database) and instantiates a hand-held vacuum object (e.g., FIG. 6E data structure), which is stored in another database (e.g., FIG. 6B or 6C). The databases and data structure/object reflects that the vacuum is carried, not purchased. The user ARD may also store data (e.g., GUID) of this vacuum in its local database as an item that is carried by the user. The user continues to peruse the retail location, selecting some items for purchase, returning some items to the shelf, and selecting other items for purchase. The ARD, MIS, and ONS databases (e.g., FIGS. 6A-6C) are updated dynamically as the user takes possession releases possession of various items. The ONS may present various offer to the user as they demonstrate interest in certain items. Throughout the shopping interval (e.g., negotiation interval), the user ARD and scanners located throughout the retail location confirm the items that are carried by the user (e.g., confirm that the user is carrying the hand-held vacuum). The user indicates to the ARD their intention to purchase the selected items. The ARD transmits a signal to the MIS and/or a purchase system, which acquires permission and data regarding user and merchant payment methods to facilitate the purchase transaction. One the purchase is completed, the MIS may update its revenue database (e.g., FIG. 6D). At the same or different time of the purchase of items from the retail location, the user may also signal to the ARD that they wish to complete the purchase transaction of the tentatively-accepted offer of vacuum bags. Upon completion of this purchase transaction, the ONS may send data regarding this purchase transaction to the EP from which the offer originated. The EP may update its own inventory databases based on data from the ONS and the completed purchase.

The invention claimed is:

1. A method of presenting purchase offers to a user comprising:
   identifying, using an augmented reality device, a target product that is being considered for purchase by a user, wherein identifying the target product using the augmented reality device comprises detecting that the user is viewing the target product, wherein the detecting comprises:
   acquiring, using an image sensor of the augmented reality device, an image of the user; and
   executing instructions stored on a computer-readable medium to recognize a visual feature based on the image, the visual feature indicating a proximity between the target product and the user;
   determining a target product price corresponding to the target product;
   transmitting target product data from the augmented reality device to a remote server, wherein the target product data comprises target product identification data corresponding to the target product and further comprises the target product price;
   receiving a purchase offer generated on the remote server, wherein generating the purchase offer on the remote server comprises identifying, using the product identification data, an alternate product and an alternate product offer price,
   wherein the purchase offer is transmitted to the augmented reality device by the remote server in accordance with a determination, by the remote server, that the alternate product offer price is less than the target product price;
   in response to receiving the purchase offer, displaying the purchase offer to the user via the augmented reality device; and
   transmitting a signal from the augmented reality device to the remote server, the signal indicating the user has provisionally accepted the purchase offer;
   in response to the user provisionally accepting the purchase offer, transmitting a second target product data from the augmented reality device to the remote server, wherein the second target product data is different from the target product data;
   receiving a second purchase offer generated on the remote server, wherein generating the second purchase offer on the remote server comprises identifying, using the second target product data, at least one of an alternate product and an alternate product offer price; and
   displaying the second purchase offer to the user via the augmented reality device.

2. The method of claim 1, wherein displaying the purchase offer to the user comprises displaying the alternate product offer price to the user.

3. The method of claim 1, wherein target product data further comprises a geographic location of the target product.

4. The method of claim 3, wherein the geographic location is represented by GPS coordinates.

5. The method of claim 1, wherein target product data comprises product category data.

6. The method of claim 1, wherein the alternate product is the same as the target product.

7. The method of claim 5, wherein the alternate product is in a same product category as the target product.

8. The method of claim 1, wherein displaying the purchase offer comprises displaying a graphic representing the alternate product and the alternate product offer price.

9. The method of claim 1, further comprising transmitting a signal from the augmented reality device to the remote server indicating whether the user has accepted the purchase offer.

10. The method of claim 1, wherein the remote server comprises a database of a plurality of computer-executable instruction sets, wherein each computer-executable instruction set is specific to a different product, wherein generating the purchase offer comprises executing a computer-executable instruction set, of the plurality of computer-executable instruction sets, corresponding to the target product, and wherein the database is stored in non-volatile computer-readable medium.

11. The method of claim 10, wherein one or more of the plurality of the product-specific computer-executable instruction sets have been transmitted to the remote server from a second remote server.

12. The method of claim 11, wherein the second remote server is controlled by a merchant.

13. The method of claim 12, further comprising transmitting offer decision data from the augmented reality device to the remote server indicating whether the user has accepted the purchase offer.

14. The method of claim 13, further comprising generating a notification data structure from the remote server to the second remote server, wherein the notification data structure comprises offer decision data.

15. The method of claim 14, wherein the notification data structure further comprises user-identification data.

16. The method of claim 15, wherein the notification data structure further comprises user payment data.

17. The method of claim 1, wherein identifying a target product that is being considered for purchase by a user comprises detecting, via the augmented reality device, movement of the target product by the user.

18. The method of claim 1, wherein identifying a target product that is being considered for purchase by a user comprises detecting, via the augmented reality device, a distance between the user and the target product.

19. The method of claim 1, wherein identifying a target product that is being considered for purchase by a user comprises detecting, via the augmented reality device, a location of the target product relative to a retail location.

20. A method of presenting purchase offers to a user comprising:
identifying, using an augmented reality device, a target product that is being considered for purchase by a user, wherein identifying the target product using the augmented reality device comprises detecting that the user is viewing the target product, wherein the detecting comprises:
acquiring, using an image sensor of the augmented reality device, an image of the user; and
executing instructions stored on a computer-readable medium to recognize a visual feature based on the image, the visual feature indicating a proximity between the target product and the user;
determining a target product price corresponding to the target product;
transmitting target product data from the augmented reality device to a remote server, wherein the target product data comprises target product identification data corresponding to the target product and further comprises the target product price;
receiving, from the remote server, a purchase offer, wherein the purchase offer is generated by a computer-implemented method comprising:
identifying, using the target product identification data, a purchase offer data structure having an alternate product and an alternate product offer price,
comparing the target product price and the alternate product offer price,
generating the purchase offer using the purchase offer data structure if the alternate product offer price is less than the target product price;
in response to receiving the purchase offer, displaying the purchase offer to the user via the augmented reality device; and
transmitting a signal from the augmented reality device to the remote server, the signal indicating the user has provisionally accepted the purchase offer;
in response to the user provisionally accepting the purchase offer, transmitting a second target product data from the augmented reality device to the remote server, wherein the second target product data is different from the target product data;
receiving a second purchase offer generated on the remote server, wherein generating the second purchase offer on the remote server comprises identifying, using the second target product data, at least one of an alternate product and an alternate product offer price; and
displaying the second purchase offer to the user via the augmented reality device.

21. A system for presenting purchase offers to a user, the system comprising:
a display; and
an augmented reality device having one or more processors configured to execute a method comprising:
identifying, via the augmented reality device, a target product that is being considered for purchase by a user, wherein identifying the target product using the augmented reality device comprises detecting that the user is viewing the target product, wherein the detecting comprises:
acquiring, using an image sensor of the augmented reality device, an image of the user; and
executing instructions stored on a computer-readable medium to recognize a visual feature based on the image, the visual feature indicating a proximity between the target product and the user;
determining a target product price corresponding to the target product;
transmitting target product data from the augmented reality device to a remote server, wherein the target product data comprises target product identification data corresponding to the target product and further comprises the target product price;
receiving a purchase offer generated on the remote server, wherein generating the purchase offer on the remote server comprises-identifying, using the product identification data,
an alternate product and an alternate product offer price,
wherein the purchase offer is transmitted to the augmented reality device by the remote server in accordance with a determination, by the remote server, that the alternate product offer price is less than the target product price;
in response to receiving the purchase offer, displaying the purchase offer to the user via the display; and
transmitting a signal from the augmented reality device to the remote server, the signal indicating the user has provisionally accepted the purchase offer;
in response to the user provisionally accepting the purchase offer, transmitting a second target product data from the augmented reality device to the remote server, wherein the second target product data is different from the target product data;
receiving a second purchase offer generated on the remote server, wherein generating the second purchase offer on the remote server comprises identifying, using the second target product data, at least one of an alternate product and an alternate product offer price; and displaying the second purchase offer to the user via the augmented reality device.

22. The system of claim 21, wherein the alternate product is available at a local merchant.

23. The system of claim 21, wherein the alternate product is available online by the same merchant as a merchant at the retail location.

24. The system of claim 21, wherein the alternate product is available online by a different merchant from a merchant at the retail location.

25. The system of claim 21, wherein the price of the target product is adjusted based on alternate product offer price.

26. The system of claim 25, wherein the price of the target product is reduced if the user agrees to purchase the target product before they depart the retail location.

\* \* \* \* \*